United States Patent
Ovsiannikov et al.

(10) Patent No.: US 7,876,957 B2
(45) Date of Patent: Jan. 25, 2011

(54) METHODS AND APPARATUSES THAT REDUCE NOISE IN IMAGE SIGNALS

(75) Inventors: Ilia Ovsiannikov, Studio City, CA (US); Dmitri Jerdev, South Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 908 days.

(21) Appl. No.: 11/806,491

(22) Filed: May 31, 2007

(65) Prior Publication Data

US 2008/0298708 A1   Dec. 4, 2008

(51) Int. Cl.
*G06K 9/00* (2006.01)
(52) U.S. Cl. .................. 382/167; 382/162; 382/266
(58) Field of Classification Search .......... 382/162, 382/167, 260, 261, 264, 266; 348/252, 241, 348/294, E5.076; 358/443, 463
See application file for complete search history.

(56) References Cited

U.S. PATENT DOCUMENTS

| | | | |
|---|---|---|---|
| 6,140,630 A | 10/2000 | Rhodes | |
| 6,204,524 B1 | 3/2001 | Rhodes | |
| 6,304,678 B1 | 10/2001 | Yang et al. | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,681,054 B1 | 1/2004 | Gindele | |
| 7,015,962 B2 | 3/2006 | Acharya | |
| 7,079,705 B2 | 7/2006 | Zhang et al. | |
| 7,164,807 B2 | 1/2007 | Morton | |
| 7,173,663 B2 * | 2/2007 | Skow et al. | 348/364 |
| 7,236,190 B2 * | 6/2007 | Yanof et al. | 348/222.1 |
| 2002/0156364 A1 | 10/2002 | Madore | |
| 2005/0052541 A1 | 3/2005 | Kondo | |
| 2005/0093982 A1 | 5/2005 | Kuroki | |
| 2006/0050783 A1 | 3/2006 | Le Dinh et al. | |

FOREIGN PATENT DOCUMENTS

| | | |
|---|---|---|
| WO | WO00/70548 | 11/2000 |
| WO | WO2005/124689 | 12/2005 |
| WO | WO2006/010276 | 2/2006 |

OTHER PUBLICATIONS

Noise Modeling for Design and Simulation of Color Imaging System—Hans B. Wach and Edward R. Dowski Jr.—CDM Optics, Inc. (USA).

* cited by examiner

*Primary Examiner*—Anh Hong Do

(57) ABSTRACT

Methods and apparatuses for noise reduction include embodiments that use a weighted combination based on the presence of edges of two calculated demosaiced signals to produce a noise reduced signal. The noise reduced signal may be sharpened based on a calculated luminance of the two demosaiced signals.

35 Claims, 20 Drawing Sheets

|     | j-2 | j-1 | j | j+1 | j+2 |
|-----|-----|-----|---|-----|-----|
| i-2 | R | G | R | G | R |
| i-1 | G | B | G | B | G |
| i   | R | G | R | G | R |
| i+1 | G | B | G | B | G |
| i+2 | R | G | R | G | R |

FIG. 1A

|     | j-2 | j-1 | j | j+1 | j+2 |
|-----|-----|-----|---|-----|-----|
| i-2 | B | G | B | G | B |
| i-1 | G | R | G | R | G |
| i   | B | G | B | G | B |
| i+1 | G | R | G | R | G |
| i+2 | B | G | B | G | B |

FIG. 1B

|     | j-2 | j-1 | j | j+1 | j+2 |
|-----|-----|-----|---|-----|-----|
| i-2 | G | B | G | B | G |
| i-1 | R | G | R | G | R |
| i   | G | B | G | B | G |
| i+1 | R | G | R | G | R |
| i+2 | G | B | G | B | G |

FIG. 1C

|     | j-2 | j-1 | j | j+1 | j+2 |
|-----|-----|-----|---|-----|-----|
| i-2 | G | R | G | R | G |
| i-1 | B | G | B | G | B |
| i   | G | R | G | R | G |
| i+1 | B | G | B | G | B |
| i+2 | G | R | G | R | G |

FIG. 1D

METHODS AND APPARATUSES THAT REDUCE NOISE IN IMAGE SIGNALS

FIELD OF THE INVENTION

The embodiments described herein relate generally to the field of digital image processing, and more specifically to a methods and apparatuses for noise reduction in digital image processing.

BACKGROUND OF THE INVENTION

Solid state imaging devices, including charge coupled devices (CCD), complementary metal oxide semiconductor (CMOS) imaging devices, and others, have been used in photo imaging applications. A solid state imaging device circuit includes a focal plane array of pixel cells or pixels as an image sensor, each cell including a photosensor, which may be a photogate, photoconductor, a photodiode, or other photosensor having a doped region for accumulating photo-generated charge. For CMOS imaging devices, each pixel has a charge storage region, formed on or in the substrate, which is connected to the gate of an output transistor that is part of a readout circuit. The charge storage region may be constructed as a floating diffusion region. In some CMOS imaging devices, each pixel may further include at least one electronic device such as a transistor for transferring charge from the photosensor to the storage region and one device, also typically a transistor, for resetting the storage region to a predetermined charge level prior to charge transference.

In a CMOS imaging device, the active elements of a pixel perform the necessary functions of: (1) photon to charge conversion; (2) accumulation of image charge; (3) resetting the storage region to a known state; (4) transfer of charge to the storage region; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imaging devices of the type discussed above are generally known as discussed, for example, in U.S. Pat. Nos. 6,140,630, 6,376,868, 6,310,366, 6,326,652, 6,204,524, and 6,333,205, assigned to Micron Technology, Inc.

One issue in the field of solid state imaging devices is noise reduction, particularly for devices with a small pixel size. As pixel size decreases, the effect of noise on image quality increases. Noise reduction techniques are used to improve the appearance of captured images. One method of noise reduction is to improve the fabrication process, however, such improvements are often cost prohibitive. An alternative solution is to apply noise filters during image processing. One noise reduction technique detects areas devoid of features (i.e., flat-field areas) and averages pixel signals in those areas of the image, as described in U.S. patent application Ser. No. 11/601,390, filed Nov. 17, 2006, which is incorporated herein by reference. This method can be implemented at a low cost in hardware logic, but can produce an unwanted side-effect of creating zipper artifacts, which are often conspicuous to the viewer. Accordingly, there is a need to provide quality, artifact-free flat-field noise reduction while maintaining a low hardware logic cost.

BRIEF DESCRIPTION OF THE DRAWINGS

FIG. 1A depicts a 5×5 portion of a pixel array (kernel) consisting of pixels having a Bayer pattern color filter array with a red pixel at location i, j.

FIG. 1B depicts a 5×5 kernel consisting of pixels having a Bayer pattern color filter array with a blue pixel at location i, j.

FIG. 1C depicts a 5×5 kernel consisting of pixels having a Bayer pattern color filter array with a green pixel at location i, j, where blue pixels are alternated with green pixels on row i.

FIG. 1D depicts a 5×5 kernel consisting of pixels having a Bayer pattern color filter array with a green pixel at location i, j, where red pixels are alternated with green pixels on row i.

DETAILED DESCRIPTION OF THE INVENTION

In the following detailed description, reference is made to the accompanying drawings which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed.

Raw imaging data from an imaging device that uses a red, green, blue (RGB) Bayer pattern color filter array (CFA) consists of a mosaic of red, green, and blue pixel values and is often referred to as Bayer RGB data. FIGS. 1A-1D show four possible pixel configurations for a 5×5 portion (kernel) of a pixel array consisting of pixels associated with a Bayer pattern color filter array. FIG. 1A shows a red pixel R at location i, j. FIG. 1B shows a blue pixel B at location i, j. FIG. 1C shows a green pixel G at location i, j, where blue pixels B are alternated with green pixels G on row i. FIG. 1D shows a green pixel G at location i, j, where red pixels R are alternated with green pixels G on row i.

Figure 2:
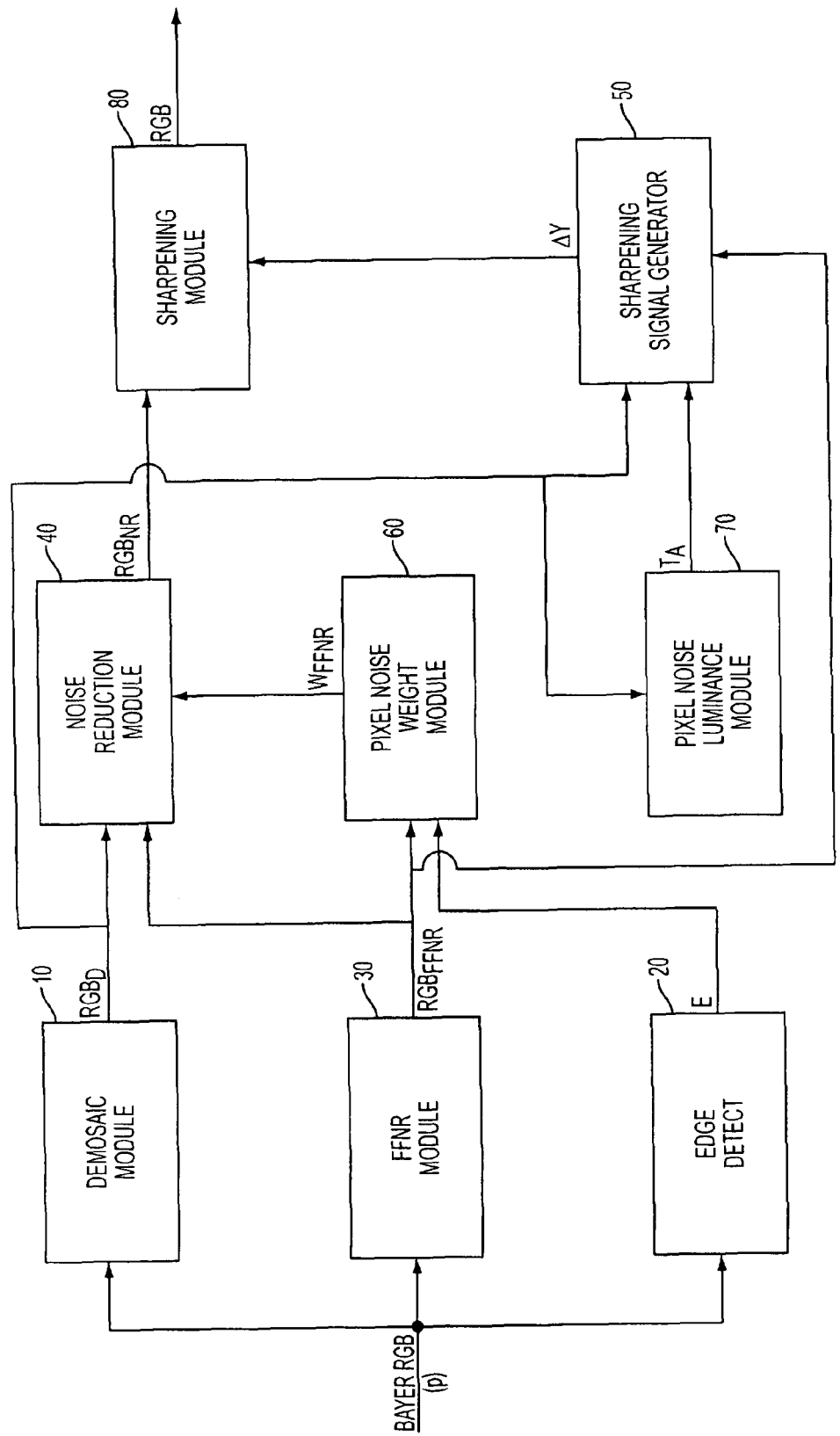
FIG. 2 illustrates a block diagram of a demosaicing process including a demosaicing module augmented with flat-field noise reduction (FFNR) and sharpening in accordance with an embodiment.

FIG. 2 illustrates a block diagram of a demosaicing process in accordance with an embodiment. It includes a demosaicing module 10 augmented with flat-field noise reduction (FFNR) module 30 and other associated processing modules. The demosaicing process includes the demosaic module 10, the flat-field noise reduction module 30, an edge detect module 20, a noise reduction module 40, a pixel noise weight module 60, a pixel noise luminance module 70. In addition, a sharpening signal generator 50, and a sharpening module 80 may also be provided. It should be appreciated that FIG. 2 refers to signals generally (e.g., $RGB_D$, etc.), but when a particular pixel signal p is being referred to, the signal will be referred to with the pixel's location i,j (e.g., $RGB_{D[i,j]}$, etc.). As shown in FIG. 2, Bayer RGB pixel data (p) is input into the demosaic module 10, the edge detect module 20, and the flat-field noise reduction module 30. The demosaic module 10 takes red, green, or blue Bayer RGB image pixel signal values $p_{i,j}$, for example, the red pixel signal value from the red pixel R located at kernel location i, j (FIG. 1A) and outputs a demosaiced signal $RGB_{D[i,j]}$ with a red component $R_{D[i,j]}$, a green component $G_{D[i,j]}$, and a blue component $B_{D[i,j]}$ based on pixels within the kernel which are adjacent the red pixel at location i, j. The output signal $RGB_{D[i,j]}$ can be calculated using any known demosaicing method. The edge detect module 20 assesses the presences of an edge near the pixel located at i,j having pixel signal $p_{i,j}$ and outputs an edge value $E_{i,j}$ (shown generally as signal E). An edge may be defined by an abruptness in intensity and/or color change between at least a first pixel signal and a second pixel signal. Any known edge detection technique can be used, and one method of calculating the edge value $E_{i,j}$ is described in more detail below. The flat-field noise reduction module 30 demosaics the input pixel signal values $p_{i,j}$ creating an output signal $RGB_{FFNR[i,j]}$ (shown generally as signal $RGB_{FFNR}$) with each pixel having a red component $R_{FFNR[i,j]}$, green component $G_{FFNR[i,j]}$, and blue component $B_{FFNR[i,j]}$ also based on pixels within a kernel adjacent a particular pixel $p_{i,j}$. The output signal, $RGB_{FFNR[i,j]}$, can be calculated using any known flat-field demosaicing method. One method of calculating the output signal $RGB_{FFNR[i,j]}$ is described in more detail below with reference to FIGS. 3-13. It should be appreciated that the demosaic module 10, the edge detect module 20, and the flat-field noise reduction module 30 may, but need not, use the same size pixel kernel to calculate their respective outputs; further, any size pixel kernel may be selected.

The demosaiced outputs of the demosaic module 10 and the flat-field noise reduction module 30 are processed in the noise reduction module 40 to produce a noise reduced output $RGB_{NR[i,j]}$ (shown generally as signal $RGB_{NR}$). The noise reduction module 40 may select the $RGB_{D[i,j]}$ signal when a sufficiently large edge value (as compared to a predetermined threshold) is output from the edge detect module 20; may select the $RGB_{FFNR[i,j]}$ signal when a sufficiently small edge value (as compared to a predetermined threshold) is output from the edge detect module 20 (e.g., in flat-field regions devoid of edges); or may blend the $RGB_{D[i,j]}$ and $RGB_{FFNR[i,j]}$ signals as a weighted sum of the two signals based on the output of the edge detect module 20 (e.g., with smaller edge values, $RGB_{FFNR[i,j]}$ would be given a larger weight than $RGB_{D[i,j]}$ and with larger edge values, $RGB_{D[i,j]}$ would be given a larger weight than $RGB_{FFNR[i,j]}$). In a desired embodiment, the noise reduced signal, $RGB_{NR[i,j]}$, output from the noise reduction module 40 is derived using the following formulas:

$$R_{NR[i,j]} = w_{FFNR[i,j]} \cdot R_{D[i,j]} + (1 - w_{FFNR[i,j]}) \cdot R_{FFNR[i,j]} \quad (1)$$

$$G_{NR[i,j]} = w_{FFNR[i,j]} \cdot G_{D[i,j]} + (1 - w_{FFNR[i,j]}) \cdot G_{FFNR[i,j]} \quad (2)$$

$$B_{NR[i,j]} = w_{FFNR[i,j]} \cdot B_{D[i,j]} + (1 - w_{FFNR[i,j]}) \cdot B_{FFNR[i,j]} \quad (3)$$

If the weight $w_{FFNR[i,j]}$ is 0, then the noise reduction module 40 selects the output $RGB_{FFNR[i,j]}$ from the flat-field noise reduction module 30. If the weight $w_{FFNR[i,j]}$ is 1, then the noise reduction module 40 selects the output $RGB_{D[i,j]}$ from the demosaic module 10. If the weight $w_{FFNR[i,j]}$ is between 0 and 1, then the noise reduction module 40 outputs a signal $RGB_{NR[i,j]}$ derived from the outputs of both the flat-field noise reduction module 30 and the demosaic module 10. A desired implementation utilizes a pixel noise weight module 60 to calculate the weight $w_{FFNR[i,j]}$ according to:

$$w_{FFNR[i,j]} = \begin{cases} 0, & v_{FFNR[i,j]} \leq 0 \\ 1, & v_{FFNR[i,j]} \geq 1 \\ v_{FFNR[i,j]}, & 0 < v_{FFNR[i,j]} < 1 \end{cases} \quad (4)$$

where $v_{FFNR[i,j]}$ is a weight calculated according to:

$$v_{FFNR[i,j]} = (E_{i,j} - T_{FFNR[i,j]}) \cdot G_{FFNR,r[i,j]} \quad (5)$$

where $E_{i,j}$ is the edge value from edge detect module 20, $G_{FFNR,r[i,j]}$ is a predetermined rate of transition from flat-field noise reduction averaging to no averaging as a function of pixel brightness (e.g., $G_{FFNR,r[i,j]} = 20$), and $T_{FFNR[i,j]}$ is a threshold value based on an offset $T_{FFNR,min[i,j]}$, a constant specifying a pixel signal value such that any lesser value will always result in full-strength flat-field noise reduction averaging (e.g., $T_{FFNR,min[i,j]} = 0$). $T_{FFNR[i,j]}$ is calculated according to:

$$T_{FFNR[i,j]} = T_{FFNR,min[i,j]} + Y_{FFNR[i,j]} \cdot G_{FFNR,p[i,j]} \quad (6)$$

where $G_{FFNR,p[i,j]}$ is a pixel noise model coefficient subjecting brighter pixels to more or less averaging than darker ones (e.g., $G_{FFNR,p[i,j]} = 0.33$). Constants $T_{FFNR,min}$ and $G_{FFNR,p}$ are selected based on sensor response characterization such that image features having amplitudes approximately equal to or less than sensor noise are subjected to noise reduction.

$Y_{FFNR[i,j]}$ is the pixel luminance (i.e., a weighted sum of the pixel signal's red, green, and blue components) of the output of the flat-field noise reduction module 30. $Y_{FFNR[i,j]}$ can be calculated using an applicable luminance formula known in the art or derived from sensor colorimetric properties using techniques known in the art, for example, the standard red, green, blue color space (sRGB) or the International Telecommunication Union Radiocommunication Sector (ITU-R) standard ITU-R BT.601. A desired implementation of pixel luminance utilizes the ITU Radiocommunication Sector standard ITU-R BT.601 such that:

$$Y_{FFNR[i,j]} = 0.299 \cdot R_{FFNR[i,j]} + 0.587 \cdot G_{FFNR[i,j]} + 0.114 \cdot B_{FFNR[i,j]} \quad (7)$$

Equation (7) can be simplified (for example, for ease of implementation in hardware) to:

$$Y_{FFNR[i,j]} = (5 * R_{FFNR[i,j]} + 9 * G_{FFNR[i,j]} + 2 * B_{FFNR[i,j]})/16 \quad (8)$$

An edge detection method used by module 20 examines pairs of neighboring pixels and outputs the maximum absolute value of the difference between pixel signal values for one of the pairs (edge value), $E_{i,j}$. Referring now to FIGS. 1C and 1D, the edge value, $E_{i,j}$, for green pixel signals $p_{i,j}$ can be calculated according to:

$$d_{1[i,j]} = |p_{i+1,j+1} - p_{i-1,j-1}| \quad (9)$$

$$d_{2[i,j]} = |p_{i-1,j} - p_{i+1,j+2}| \quad (10)$$

$$d_{3[i,j]} = |p_{i,j-1} - p_{i+2,j+1}| \quad (11)$$

$$d_{4[i,j]} = |p_{i+1,j-1} - p_{i-1,j+2}| \quad (12)$$

$$d_{5[i,j]} = |p_{i+2,j-1} - p_{i,j+1}| \quad (13)$$

$$d_{6[i,j]} = |p_{i,j-1} - p_{i-2,j+1}| \quad (14)$$

$$d_{7[i,j]} = |p_{i,j+1} - p_{i-2,j-1}| \quad (15)$$

$$d_{8[i,j]} = |p_{i+1,j+2} - p_{i-1,j}| \quad (16)$$

$$d_{9[i,j]} = |p_{i+1,j} - p_{i-1,j-2}| \quad (17)$$

$$E_{i,j} = \max(d_{1[i,j]}, d_{2[i,j]}, d_{3[i,j]}, d_{4[i,j]}, d_{5[i,j]}, d_{6[i,j]}, d_{7[i,j]}, d_{8[i,j]}, d_{9[i,j]}) \quad (18)$$

Referring to FIGS. 1A and 1B, the edge value, $E_{i,j}$, for red and blue pixel signals $p_{i,j}$ can be calculated according to:

$$d_{1[i,j]} = |p_{i+1,j+1} - p_{i-1,j-1}| \quad (19)$$

$$d_{2[i,j]} = |p_{i,j+1} - p_{i,j-1}| \quad (20)$$

$$d_{3[i,j]} = |p_{i+1,j} - p_{i-1,j}| \quad (21)$$

$$d_{4[i,j]} = |p_{i,j} - p_{i,j-2}| \quad (22)$$

$$d_{5[i,j]} = |p_{i,j} - p_{i,j+2}| \quad (23)$$

$$d_{6[i,j]} = |p_{i,j} - p_{i+2,j}| \quad (24)$$

$$d_{7[i,j]} = |p_{i,j} - p_{i-2,j}| \quad (25)$$

$$E_{i,j} = \max(d_{1[i,j]}, d_{2[i,j]}, d_{3[i,j]}, d_{4[i,j]}, d_{5[i,j]}, d_{6[i,j]}, d_{7[i,j]}) \quad (26)$$

The output of the noise reduction module 40 may be sharpened to produce a sharpened final output $RGB_{i,j}$ (shown generally as signal RGB). Sharpening can be produced by a sharpening module 80 as a function of the output ($RGB_{NR}$) of the noise reduction module 40 and a signal from the sharpening signal generator module 50 ($\Delta Y$). The sharpening module 80 takes the output of the sharpening signal generator 50, a high-frequency sharpening signal $\Delta Y_{i,j}$ (functioning as a high-pass filter), which is multiplied by a gain, $G_{A[i,j]}$, and then added to the output of the noise reduction module 40 $RGB_{NR[i,j]}$ to produce a sharpened, noise reduced signal $RGB_{i,j}$. The sharpening module 80 emulates an unsharp mask operation, without requiring additional memory and logic to calculate luminance signals in pixels surrounding the pixel being demosaiced (the pixel located at i,j) as required by conventional unsharp mask operations. The sharpened final output $RGB_{i,j}$ of the sharpening module 80 is calculated according to:

$$R_{i,j} = R_{NR[i,j]} + G_{A[i,j]} \cdot \Delta Y_{i,j} \quad (27)$$

$$G_{i,j} = G_{NR[i,j]} + G_{A[i,j]} \cdot \Delta Y_{i,j} \quad (28)$$

$$B_{i,j} = B_{NR[i,j]} + G_{A[i,j]} \cdot \Delta Y_{i,j} \quad (29)$$

where $G_{A[i,j]}$ is the sharpening gain that controls the amount of sharpening applied to the image, $\Delta Y_{i,j}$, an aperture correction value, is calculated by the sharpening signal generator 50 as follows:

$$\Delta Y_{i,j} = \max(|Y_{D[i,j]} - Y_{FFNR[i,j]}| - T_{A[i,j]}, 0) \cdot \text{sgn}(Y_{D[i,j]} - Y_{FFNR[i,j]}) \quad (30)$$

where $\text{sgn}(Y_{D[i,j]} - Y_{FFNR[i,j]})$ is the sign of $Y_{D[i,j]} - Y_{FFNR[i,j]}$ (i.e., -1 when $Y_{D[i,j]} - Y_{FFNR[i,j]} < 0$, 1 when $Y_{D[i,j]} - Y_{FFNR[i,j]} > 0$, and 0 when $Y_{D[i,j]} - Y_{FFNR[i,j]} = 0$) and $Y_{D[i,j]}$ and $Y_{FFNR[i,j]}$ are pixel luminance values output by demosaicing module 10 and the flat-field noise reduction module 30, respectively. $T_{A[i,j]}$ specifies the minimum luminance difference value necessary to produce a sharpening effect to a pixel with luminance $Y_{D[i,j]}$ as calculated by the pixel noise luminance module 70 as follows:

$$T_{A[i,j]} = T_{A,min[i,j]} + G_{A,T[i,j]} \cdot Y_{D[i,j]} \quad (31)$$

$T_{A,min[i,j]}$ is the minimum value for $T_{A[i,j]}$ and $G_{A,T[i,j]}$ is a pixel noise model coefficient allowing for sharpening of brighter pixels. $T_{A[i,j]}$ and $G_{A,T[i,j]}$ are selected based on image sensor response such that image features having amplitudes of approximately equal to or less than sensor noise are not amplified by sharpening. It should be appreciated that $Y_{D[i,j]}$ and $Y_{FFNR[i,j]}$ may be calculated using techniques known in the art, such as a formula appropriate to the color space corresponding to the pre-color-correction sensor responses. One implementation calculates $Y_{D[i,j]}$ using the same coefficients as $Y_{FFNR[i,j]}$ in Equations (7) and (8) above, such that:

$$Y_{D[i,j]} = 0.299 \cdot R_{D[i,j]} + 0.587 \cdot G_{D[i,j]} + 0.114 \cdot B_{D[i,j]} \quad (32)$$

Equation (32) can be simplified (for example, for ease of implementation in hardware) to:

$$Y_{D[i,j]} = (5 * R_{D[i,j]} + 9 * G_{D[i,j]} + 2 * B_{D[i,j]})/16 \quad (33)$$

While a desired implementation allows for the variance of all coefficients as a function of pixel position (i,j) in the image sensor array (for example, to compensate for higher noise at an image sensor's periphery due to digital gain employed by additional modules in the image sensor, such as, for example, a lens vignetting module), it should be appreciated that these values may be constant and not vary as a function of pixel position (i,j), for example, $G_{A,T}$, $G_A$, $G_{FFNR,g}$, and $G_{FFNR,r}$.

In one embodiment, the flat-field noise reduction module 30 (FIG. 2) uses 5×5 kernels as shown in FIGS. 1A-1D to calculate an averaged, noise-reduced demosaiced output $RGB_{FFNR[i,j]}$. FIGS. 1A-1D show the viable color patterns for 5×5 kernels having a Bayer color filter array. Due to the Bayer pattern, the calculation of the flat-field noise reduced response varies depending on the color of the pixel being demosaiced (e.g., red, green, or blue) and the color channel of the pixel being demosaiced (e.g., blue, greenblue (green pixels in the same row as blue pixels), greenred (green pixels in the same row as red pixels), and red).

Figure 3:
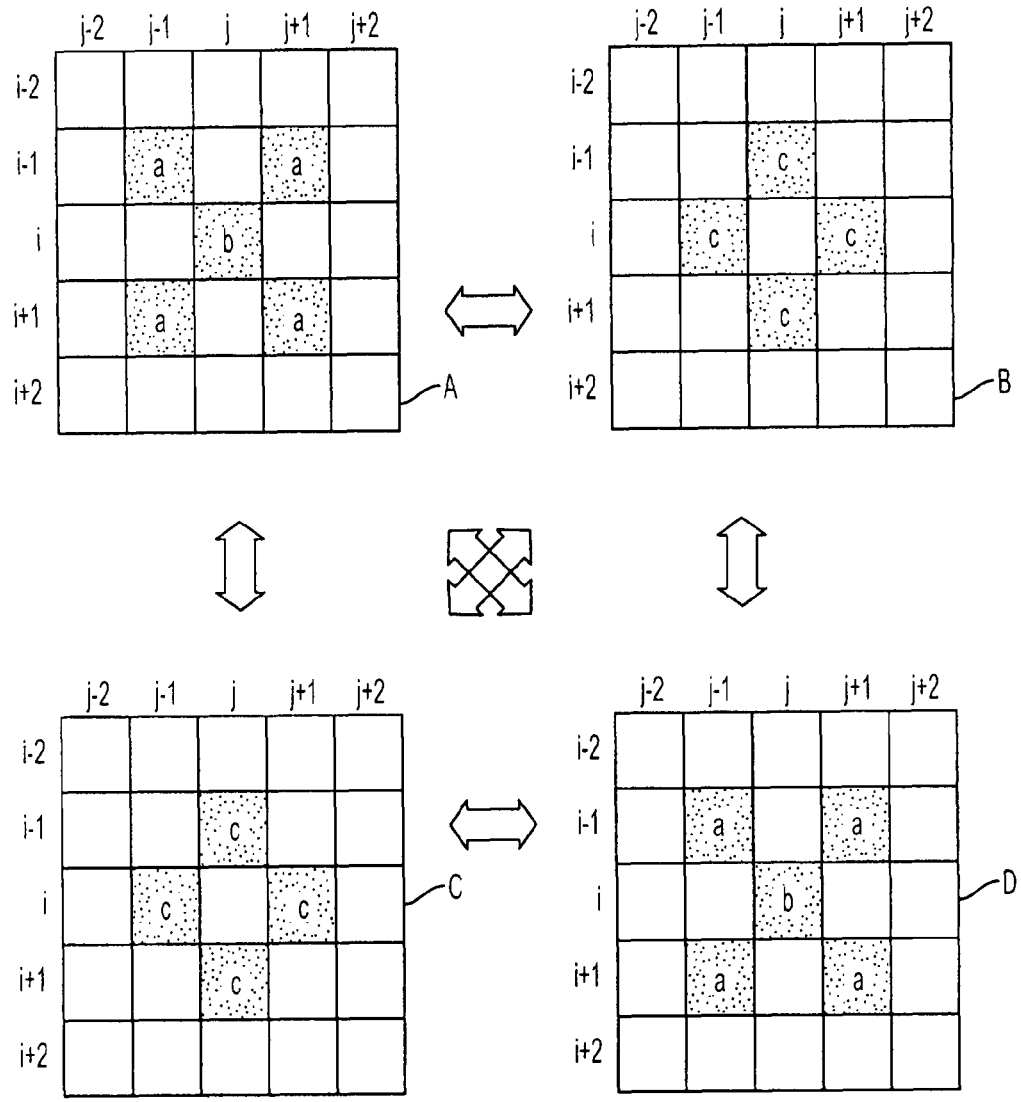
FIG. 3 shows four green pixel configurations (kernel types A-D) derived from the inner 3×3 sub-kernel of the four 5×5 kernels shown in FIGS. 2A-2D.

FIG. 3 shows four green pixel configurations (kernel types A-D) selected from a subset (shaded) of the pixels of the four 5×5 kernels shown in FIGS. 1A-1D (for example, FIG. 1A may be represented by kernel type B, FIG. 1B may be represented by kernel type C, FIG. 1C may be represented by kernel type D, and FIG. 1D may be represented by kernel type A). Kernel types A-D are used to average green pixel responses. The block arrows illustrate how the kernel shapes change moving one pixel left or right along a horizontal edge, up or down along a vertical edge, and diagonally along a diagonal edge. The flat-field noise reduction module 30 (FIG. 2) output for the green component $G_{FFNR[i,j]}$ of a Bayer RGB pixel signal $p_{i,j}$, is constructed as a weighted sum of raw pixel responses. For ease of optimization, only a 3×3 kernel is considered. However, it should be appreciated that any size kernel may be used to generate the flat-field noise reduced output. Kernel types A and B of FIG. 3 match kernel types D and C respectively, accordingly all calculations are derived for kernel types A and B, but may be applied to types D and C respectively. To maintain image symmetry, symmetric pixels are assigned the same pixel weight (e.g., pixel weights a and b for green pixels in kernel type A and pixel weight c for green pixels in kernel type B).

Pixel weights may be selected such that the flat-field noise reduction module 30 (FIG. 2) output does not depend on the shape of the kernel. If the output depended on the shape of the kernel, the flat-field noise reduction module 30 (FIG. 2) would produce varying responses for pixels lying along edges. Such undesirable variation may appear as zipper artifacts along the edges of the image.

To derive pixel weights for kernels of various shapes and colors to produce zipper-free noise reduction, viable kernel types may be considered; edges crossing those kernel types at various locations may be considered; restrictions and dependencies on pixel weights may be generated such that the output is not kernel shape dependent; restrictions and dependencies may be expressed as a system of equations; and the equations may be solved to minimize noise. Accordingly, for kernel type A, the green component $G_{FFNR[i,j]}$ can be expressed as:

$$G_{FFNR[i,j]}=a\cdot(p_{i-1,j-1}+p_{i+1,j+1}+p_{i+1,j-1}+p_{i-1,j+1})+b\cdot p_{i,j} \quad (34)$$

and the green component $G_{FFNR[i,j]}$ for kernel type B can be expressed as:

$$G_{FFNR[i,j]}=c\cdot(p_{i,j-1}+p_{i,j+1}+p_{i+1,j}+p_{i-1,j}) \quad (35)$$

For reasons of symmetry, pixels marked "a" in kernel type A must have equal pixel weights, therefore:

$$4a+b=1 \quad (36)$$

and pixels marked "c" in kernel type B must have equal pixel weights, therefore:

$$4c=1 \Rightarrow (\text{i.e., therefore}) \; c=0.25 \quad (37)$$

Additional constraints can be derived when edges crossing kernel types A-D at various locations are considered. Since flat-field noise reduction module 30 (FIG. 2) output is effectively disabled in the presence of edges (see Equations (1)-(3)), only movements along edges are considered. Movements across edges are not considered. The edges considered are shown in FIGS. 4A-4B and FIGS. 5A-5D.

Figure 4A:
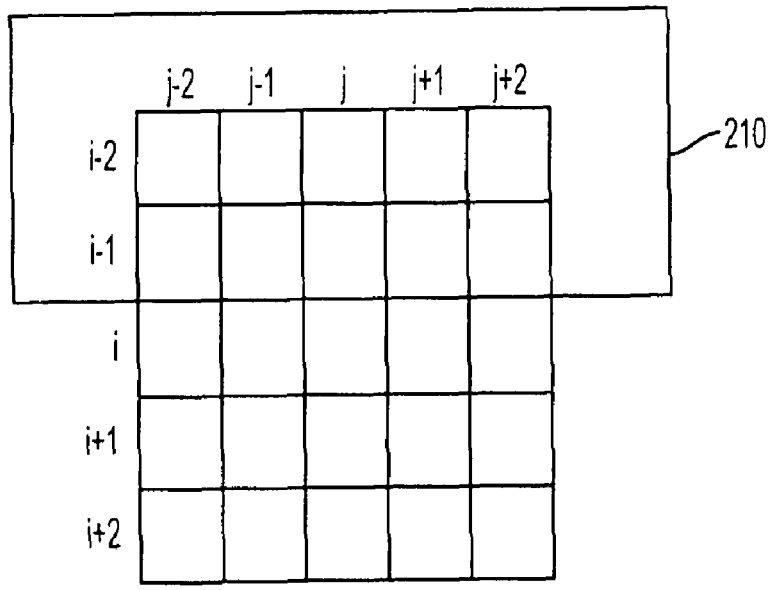
FIG. 4A illustrates a horizontal edge passing between rows i−1 and i of a 5×5 kernel.
Figure 4B:
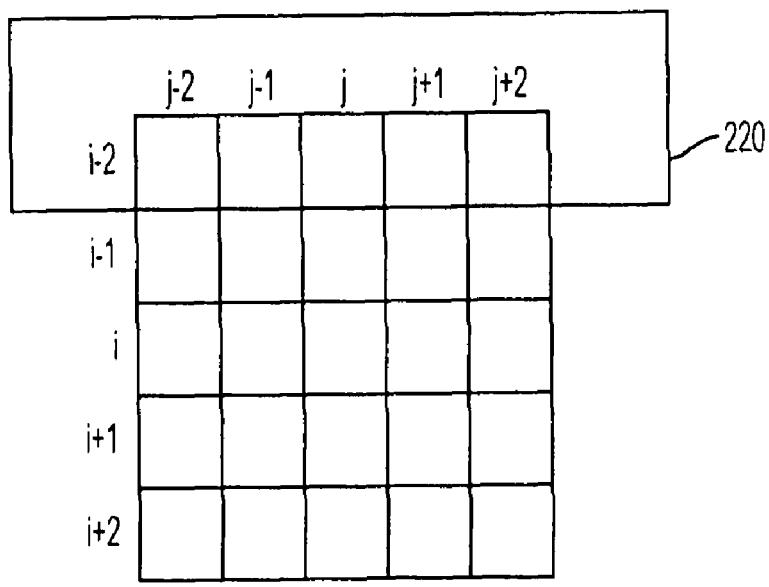
FIG. 4B illustrates a horizontal edge passing between rows i−2 and i−1 of a 5×5 kernel.

FIGS. 4A-4B show a horizontal edge passing through a flat-field noise reduction kernel. The horizontal edge may be in at least two positions, including a horizontal edge 210 passing between rows i−1 and i (FIG. 4A) and a horizontal edge 220 passing between rows i−1 and i−2 (FIG. 4B). Other cases of horizontal and vertical edges can be derived by rotating FIGS. 4A-4B by 90, 180, and 270 degrees.

Figure 5A:
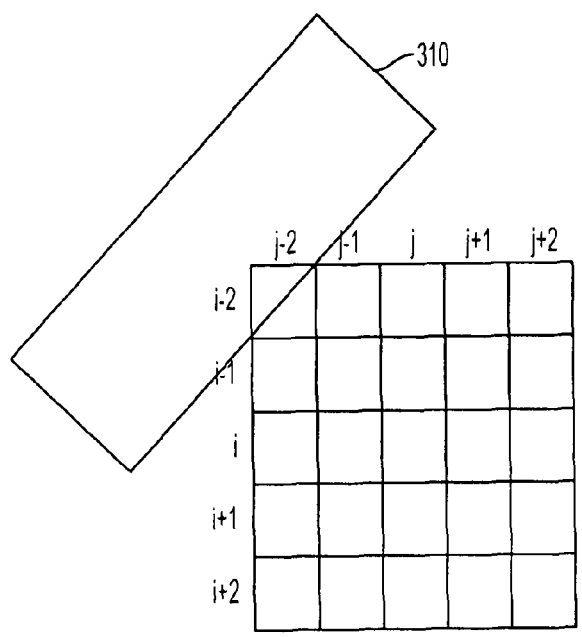
FIG. 5A illustrates a diagonal edge passing through pixel i−2, j−2 of a 5×5 kernel.
Figure 5B:
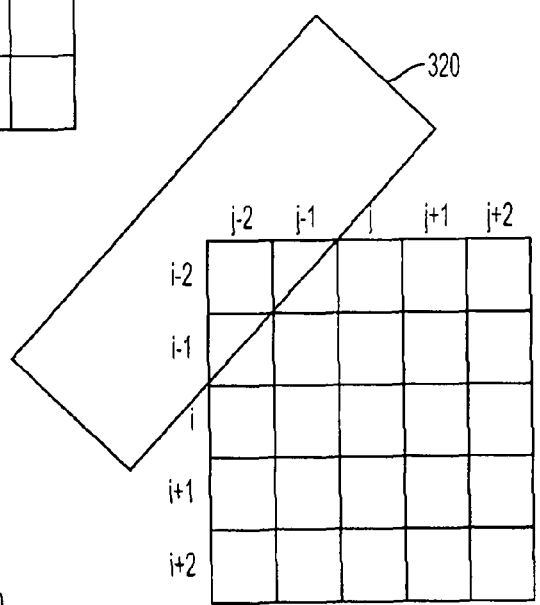
FIG. 5B illustrates a diagonal edge passing through pixel i−1, j−2 to pixel i−2, j−1 of a 5×5 kernel.
Figure 5C:
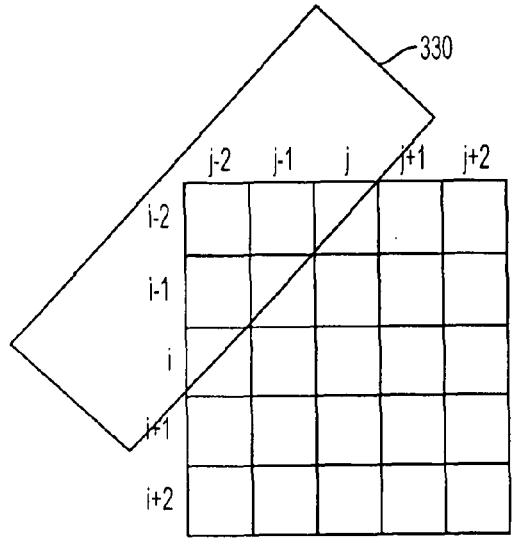
FIG. 5C illustrates a diagonal edge passing through pixel i, j−2 to pixel i−2, j of a 5×5 kernel.
Figure 5D:
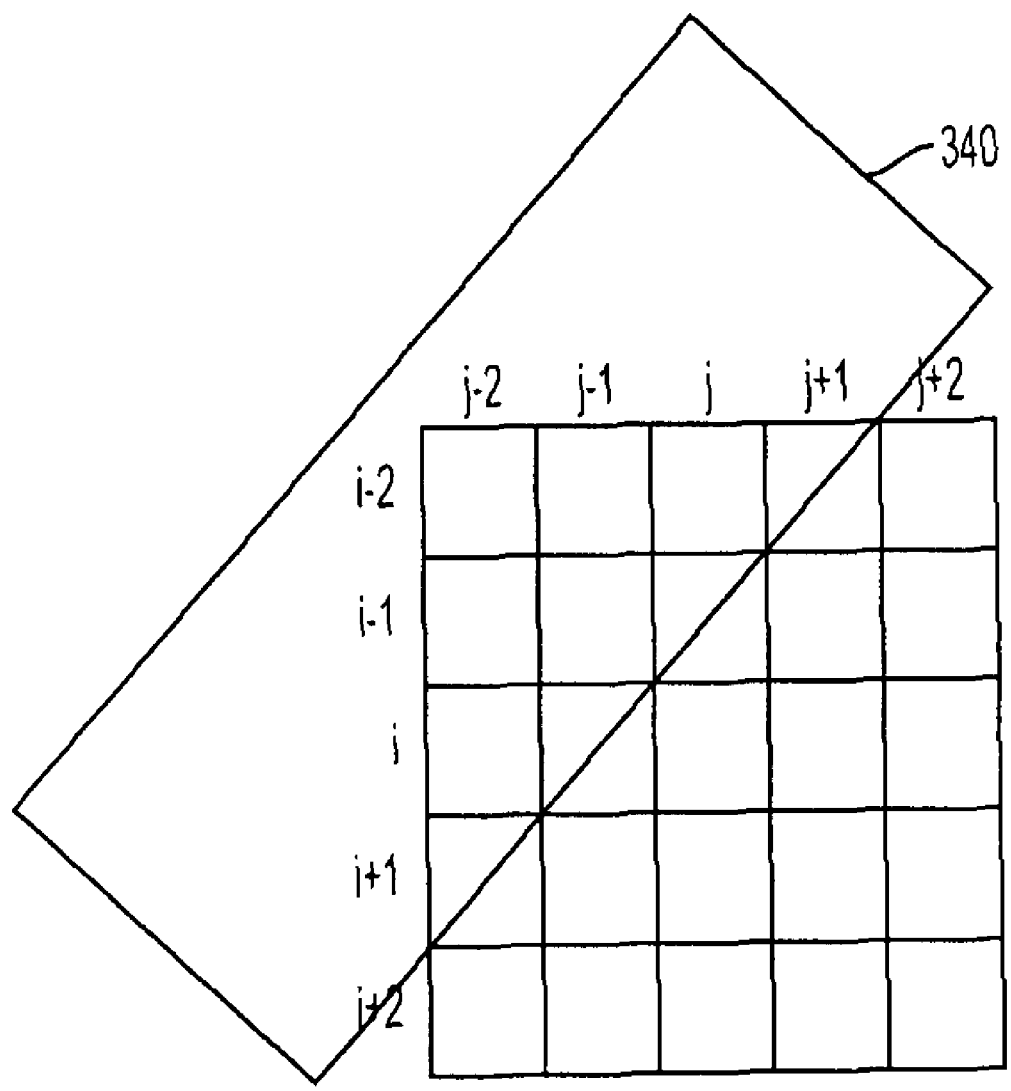
FIG. 5D illustrates a diagonal edge passing through pixel i+1, j−2 to pixel i−2, j+1 of a 5×5 kernel.

FIGS. 5A-5D show a diagonal edge passing through a flat-field noise reduction kernel. The diagonal edge may be in at least four positions, including position 310 covering only pixel i−2, j−2 (FIG. 5A), position 320 covering pixels from i−1, j−2 to i−2, j−1 (FIG. 5B), position 330 covering pixels from i, j−2 to i−2, j (FIG. 5C), and position 340 covering pixels i+1, j−2 to i−2, j+1 (FIG. 5D). Other cases of diagonal edges can be derived by rotating FIGS. 5A-5D by 90, 180, and 270 degrees.

Figure 6A:
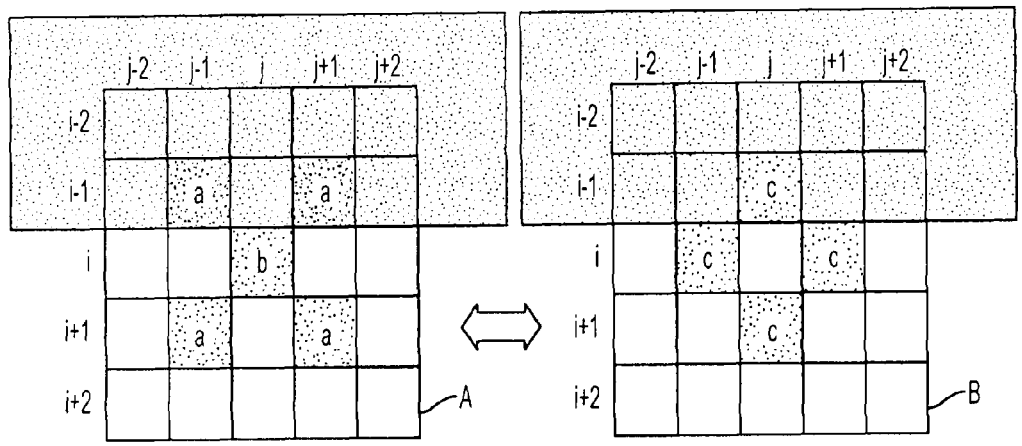
FIG. 6A illustrates a horizontal edge passing between row i−1 and i of green kernel types A and B.
Figure 6B:
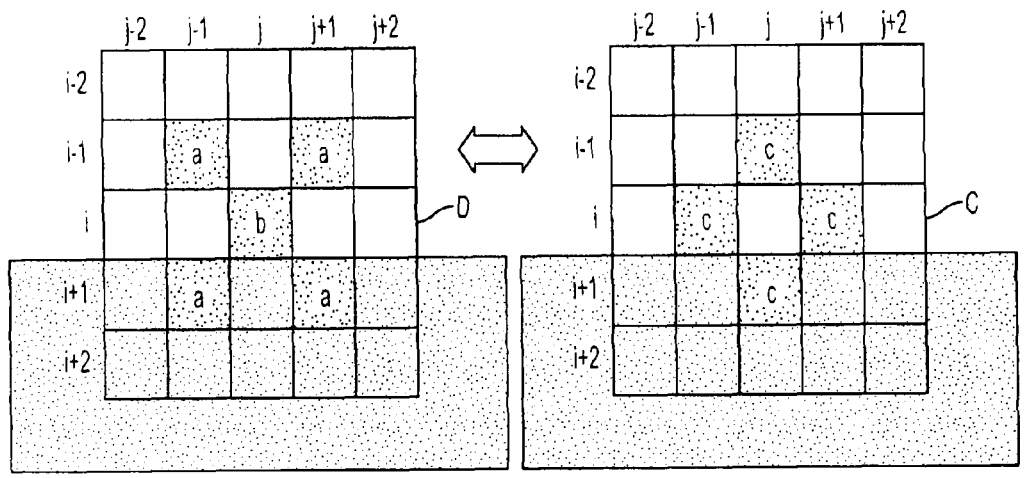
FIG. 6B illustrates a 180 degree rotation of FIG. 6A, which results in a horizontal edge passing between row i and i+1 of green kernel types D and C.
Figure 6C:
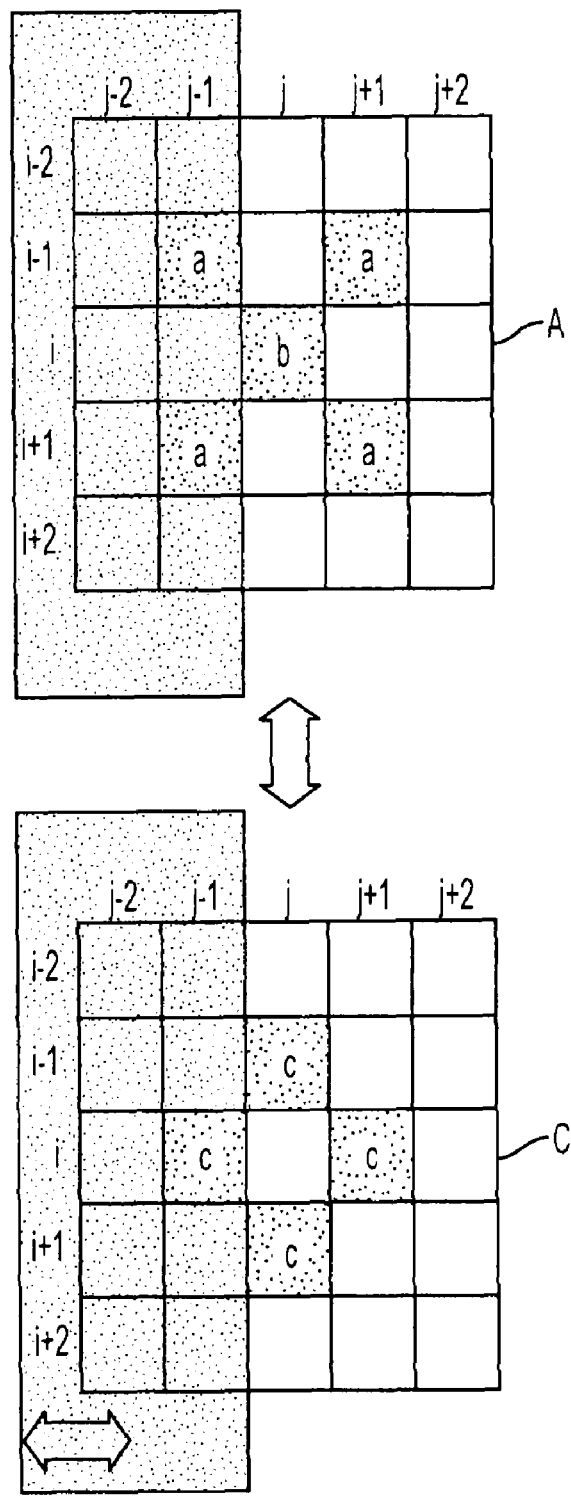
FIG. 6C illustrates a 90 degree rotation of FIG. 6A, which results in a horizontal edge passing between columns j−1 and j of green kernel types A and C.
Figure 6D:
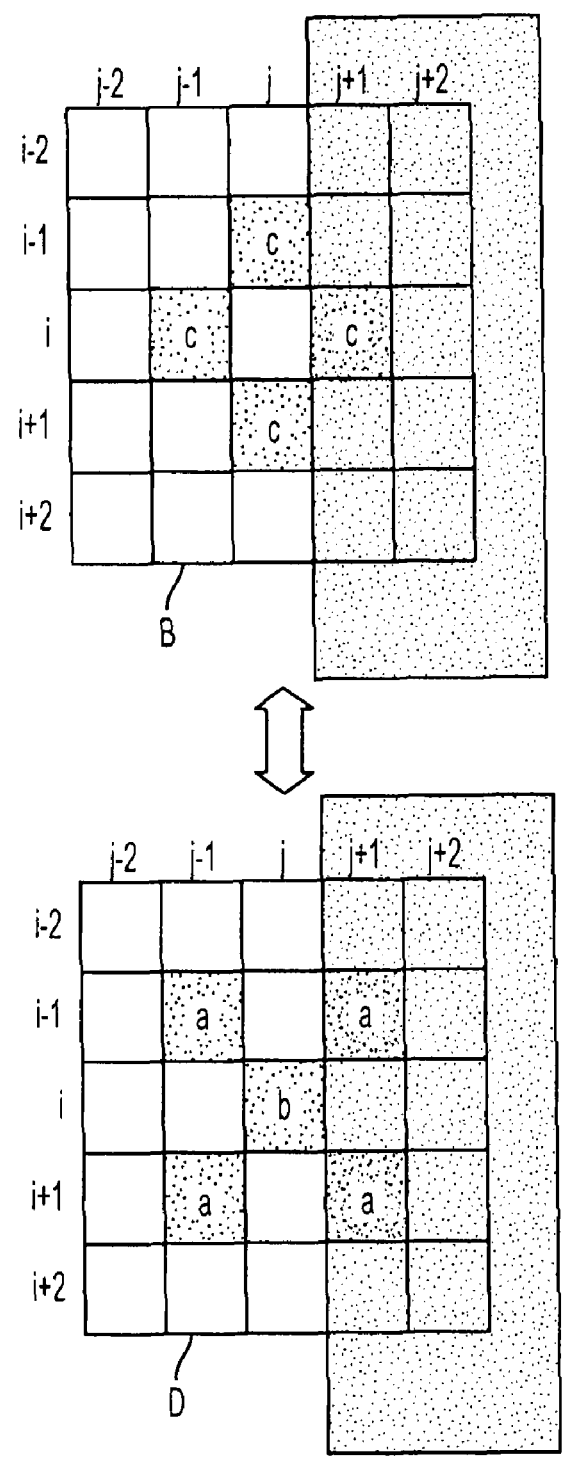
FIG. 6D illustrates a 270 degree rotation of FIG. 6A, which results in a horizontal edge passing between columns j and j+1 of green kernel types B and D.

Green kernel types remains identical along 45/135 degree diagonal edges (i.e., kernel type A is identical to kernel type D and kernel type B is identical to kernel type C), thus, no additional constraints on kernel pixel weights are imposed for the diagonal movement cases. When considering moving between kernel types along horizontal and vertical edges, kernel types alternate as shown in FIGS. 6A-6D. Only edges passing between row i−1 and i as shown in FIG. 6A and similar cases resulting from rotation as shown in FIGS. 6B-6D affect kernel output, thus an additional constraint is:

$$a+a=c \Rightarrow 2a=0.25 \Rightarrow a=0.125. \quad (38)$$

Solving equation (36) for b, b=1−4a⇒b=1−4*0.125⇒b=0.5. Therefore, a=0.125, b=0.5, and c=0.25. Equations (34)-(35) can be rewritten in terms of the calculated values for pixel weights a-c. Accordingly, for kernel type A, the green component $G_{FFNR[i,j]}$ can be expressed as:

$$G_{FFNR[i,j]}=0.125\cdot(p_{i-1,j-1}+p_{i+1,j+1}+p_{i+1,j-1}+p_{i-1,j+1})+0.5\cdot p_{i,j} \quad (39)$$

and the green component $G_{FFNR[i,j]}$ for kernel type B can be expressed as:

$$G_{FFNR[i,j]}=0.25\cdot(p_{i,j-1}+p_{i,j+1}+p_{i+1,j}+p_{i-1,j}) \quad (40)$$

Figure 7:
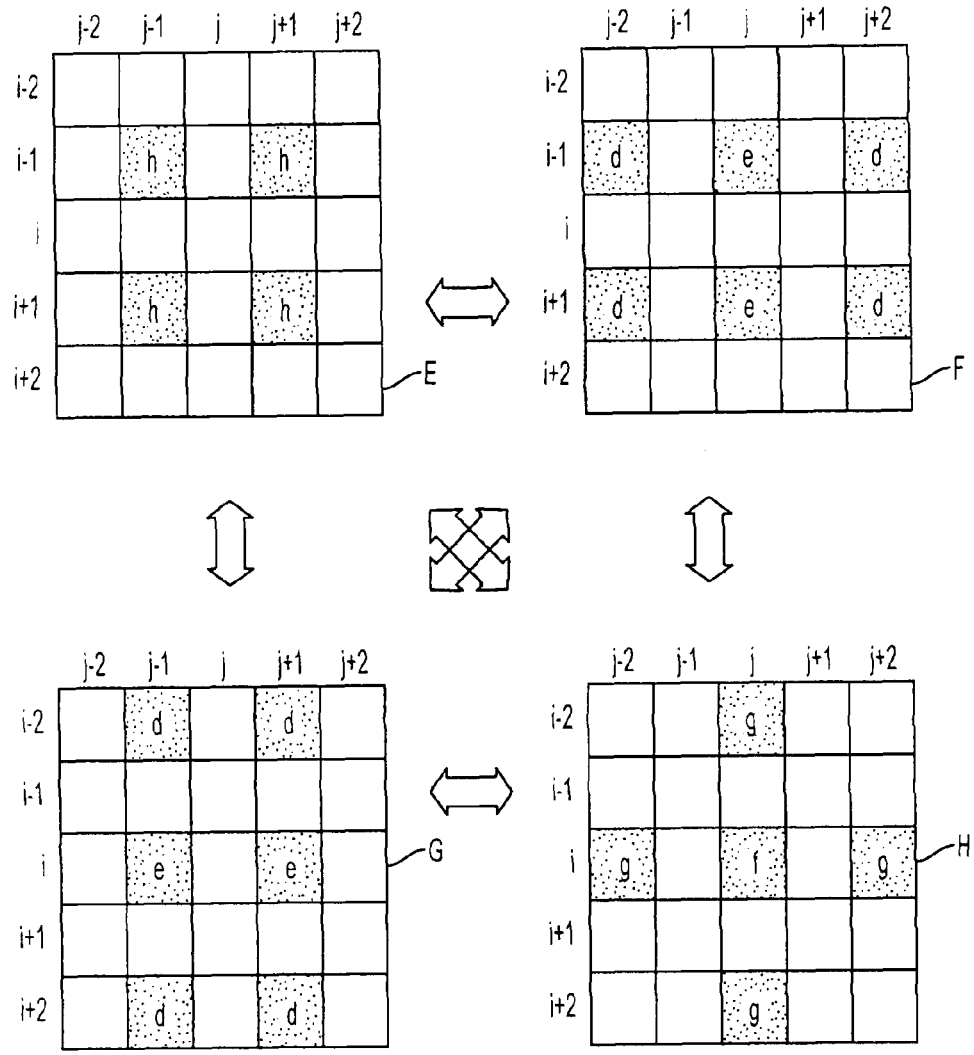
FIG. 7 shows four red and blue pixel configurations (kernel types E-H) derived from the four 5×5 kernels shown in FIGS. 2A-2D.

FIG. 7 shows four red and blue pixel configurations (kernel types E-H) used in the flat-field noise reduction module 30 (FIG. 2) and selected from a subset (shaded) of the pixels of the four 5×5 kernels shown in FIGS. 1A-1D (for example for red pixels, FIG. 1A may be represented by kernel type H, FIG. 1B may be represented by kernel type E, FIG. 1C may be represented by kernel type F, and FIG. 1D may be represented by kernel type G and for blue pixels FIG. 1A may be represented by kernel type E, FIG. 1B may be represented by kernel type H, FIG. 1C may be represented by kernel type G, and FIG. 1D may be represented by kernel type F). For ease of processing, kernel type H does not utilize the red or blue pixels located in the corners of the kernel (i.e., pixels i−2, j−2; i+2, j−2; i−2, j+2; or i+2, j+2); it should be appreciated that these pixels may be utilized to average red and blue pixel responses. Kernel types E-H are used to average red and blue pixel responses. The block arrows illustrate how the kernel shapes change moving one pixel left or right along a horizontal edge, up or down along a vertical edge, and diagonally along a diagonal edge. As with the green $G_{FFNR[i,j]}$ component, the flat-field noise reduction module 30 (FIG. 2) output for the red $R_{FFNR[i,j]}$ and blue $B_{FFNR[i,j]}$ components of a Bayer RGB pixel $p_{i,j}$, is constructed as a weighted sum of the raw pixel responses. To maintain image symmetry, symmetric pixels are assigned the same pixel weight (e.g., pixel weight h for pixels in kernel type E, pixel weights e and d for pixels in kernel types F and G, and pixel weights f and g for pixels in kernel type H). As with green pixels, since flat-field noise reduction is effectively disabled in the presence of edges, only movements along edges are considered and not across. Edges must be at least one pixel away from the pixel being demosaiced.

There are three distinct red and blue kernel types, E, F, and H. Kernel type G is identical to kernel type F rotated 90 degrees. For kernel type E, the output of the flat-field noise reduction module 30 (FIG. 2) is defined as:

$$R_{FFNR[i,j]} = h \cdot (p_{i-1,j-1} + p_{i-1,j+1} + p_{i+1,j-1} + p_{i+1,j+1}) \quad (41)$$

$$B_{FFNR[i,j]} = h \cdot (p_{i-1,j-1} + p_{i-1,j+1} + p_{i+1,j-1} + p_{i+1,j+1}) \quad (42)$$

The output of kernel type F is calculated as:

$$R_{FFNR[i,j]} = d \cdot (p_{i-1,j-2} + p_{i-1,j+2} + p_{i+1,j-2} + p_{i+1,j+2}) + e \cdot (p_{i-1,j} + p_{i+1,j}) \quad (43)$$

$$B_{FFNR[i,j]} = d \cdot (p_{i-1,k-2} + p_{i-1,j+2} + p_{i+1,j-2} + p_{i+1,j+2}) + e \cdot (p_{i-1,j} + p_{i+1,j}) \quad (44)$$

The output of kernel type G is calculated as:

$$R_{FFNR[i,j]} = d \cdot (p_{i-2,j-1} + p_{i-2,j+1} + p_{i+2,j-1} + p_{i+2,j+1}) + e \cdot (p_{i,j-1} + p_{i,j+1}) \quad (45)$$

$$B_{FFNR[i,j]} = d \cdot (p_{i-2,j-1} + p_{i-2,j+1} + p_{i+2,j-1} + p_{i+2,j+1}) + e \cdot (p_{i,j-1} + p_{i,j+1}) \quad (46)$$

The output of kernel type H is:

$$R_{FFNR[i,j]} = g \cdot (p_{i,j-2} + p_{i,j+2} + p_{i-2,j} + p_{i+2,j}) + f \cdot p_{i,j} \quad (47)$$

$$B_{FFNR[i,j]} = g \cdot (p_{i,j-2} + p_{i,j+2} + p_{i-2,j} + p_{i+2,j}) + f \cdot p_{i,j} \quad (48)$$

For kernel type E:

$$4h = 1 \Rightarrow h = 0.25 \quad (49)$$

For kernel types F and G:

$$2e + 4d = 1 \quad (50)$$

For kernel type H:

$$4g + f = 1 \quad (51)$$

Figure 8:
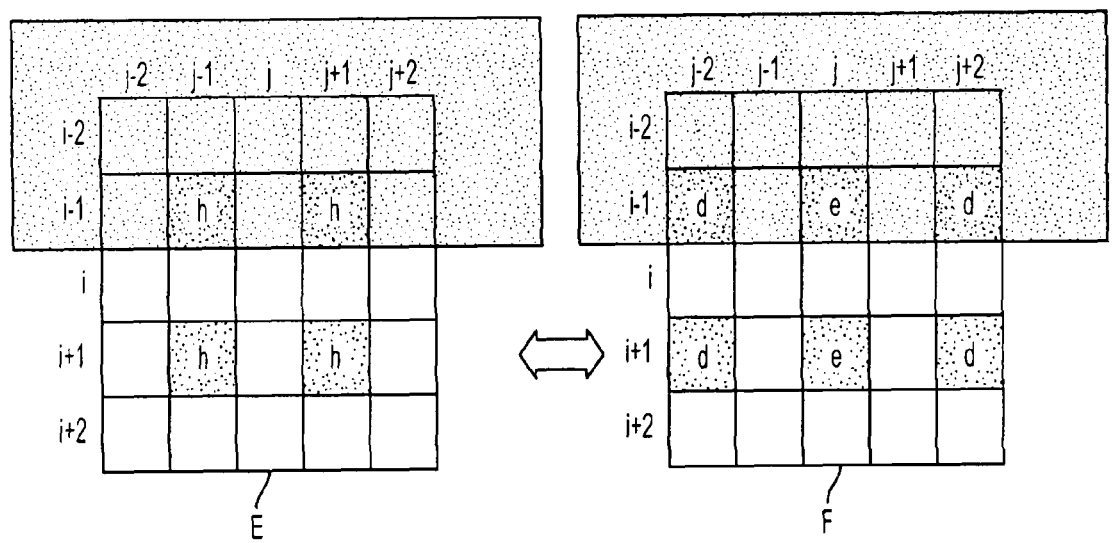
FIG. 8 illustrates a horizontal edge passing between row i−1 and i of red and blue kernel types E and F.

As with the green kernel types A-D, additional constraints can be derived when edges crossing kernel types E-H at various locations are considered. For a horizontal edge passing between row i−1 and i of kernel types E and F, kernel types E and F will alternate as shown in FIG. 8, therefore an additional constraint is:

$$2h = 2d + e \quad (52)$$

Figure 9:
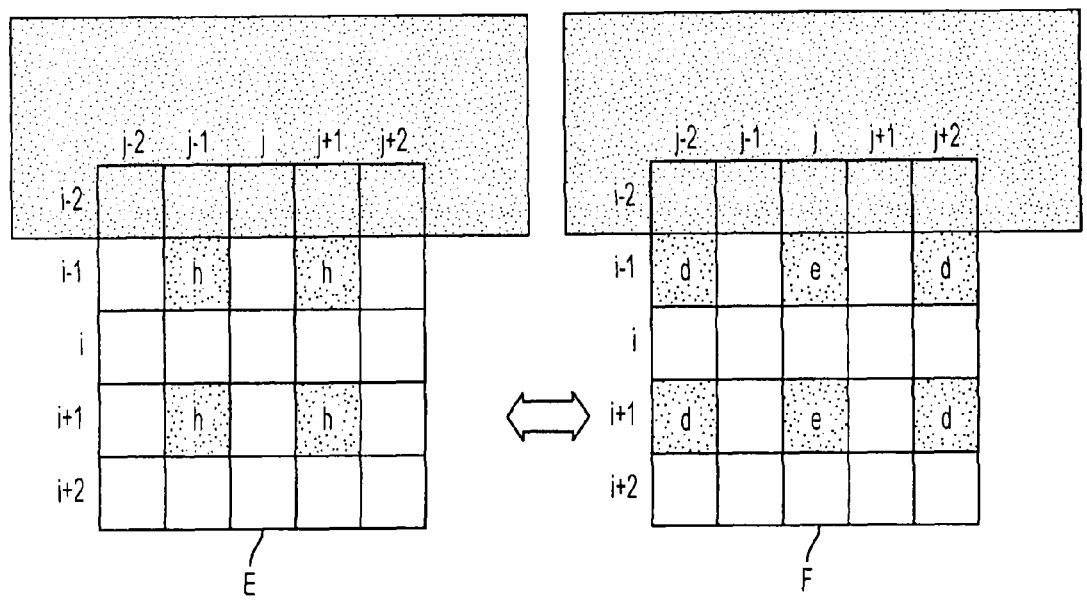
FIG. 9 illustrates a horizontal edge passing between row i−2 and i−1 of red and blue kernel types E and F.
Figure 10:
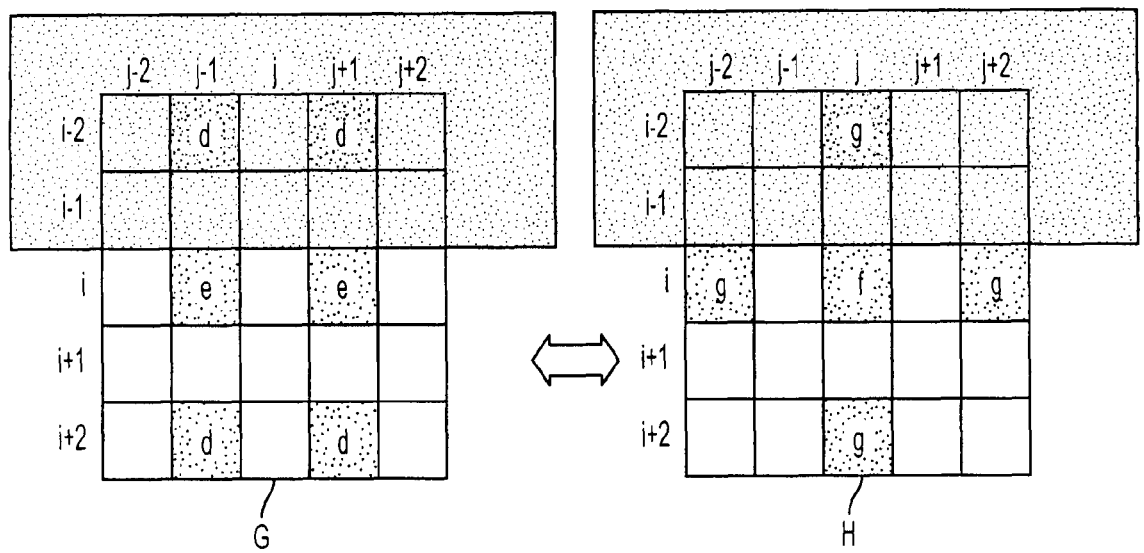
FIG. 10 illustrates a horizontal edge passing between row i−1 and i of red and blue kernel types G and H.

For a horizontal edge passing between row i−2 and i−1 of kernel types E and F, kernel types E and F will alternate as shown in FIG. 9, but the edge of the non-flat field portion of the image does not cover any pixels of interest in those kernels and thus no additional constraints can be derived. For horizontal edges passing anywhere between rows i and i−2 (and its rotated equivalents) kernel types G and H will alternate as shown in FIG. 10 (while FIG. 10 only illustrates the edge passing between rows i−1 and i, an edge passing between rows i−2 and i−1 would result in the same pixels of interest being covered by the non-flat field portion of the image), therefore:

$$2d = g \quad (53)$$

Solving equation (51) for f and substituting from equations (50) and (53) yields:

$$f = 1 - 4g \Rightarrow f = 1 - 4(2d) \Rightarrow f = 1 - 8d \Rightarrow f = 1 - 2(1 - 2e) \Rightarrow f = 1 - 2 + 4e \Rightarrow f = 4e - 1 \quad (54)$$

Figure 11A:
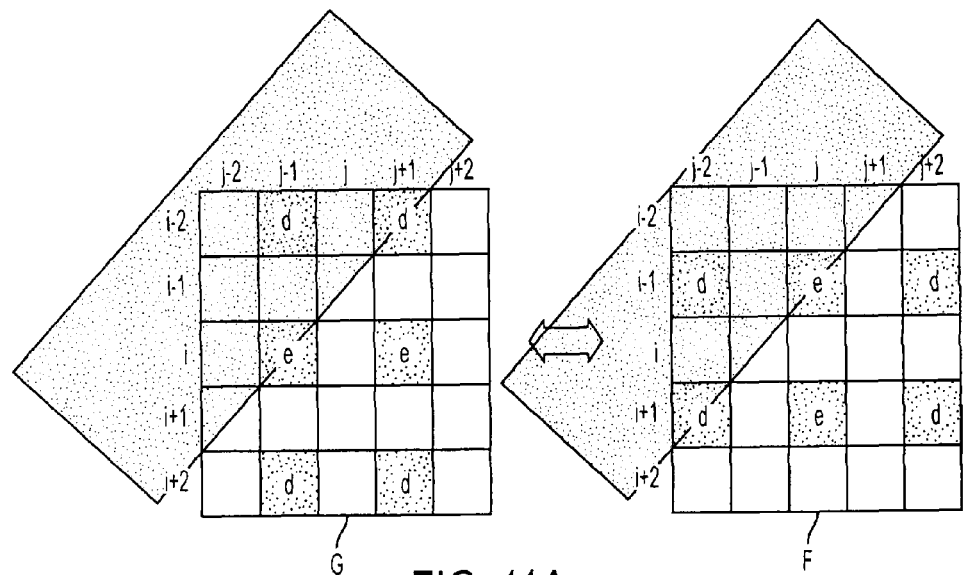
FIG. 11A illustrates a diagonal edge passing through pixel i+1, j−2 to pixel i−2, j+1 of red and blue kernel types G and F.
Figure 11B:
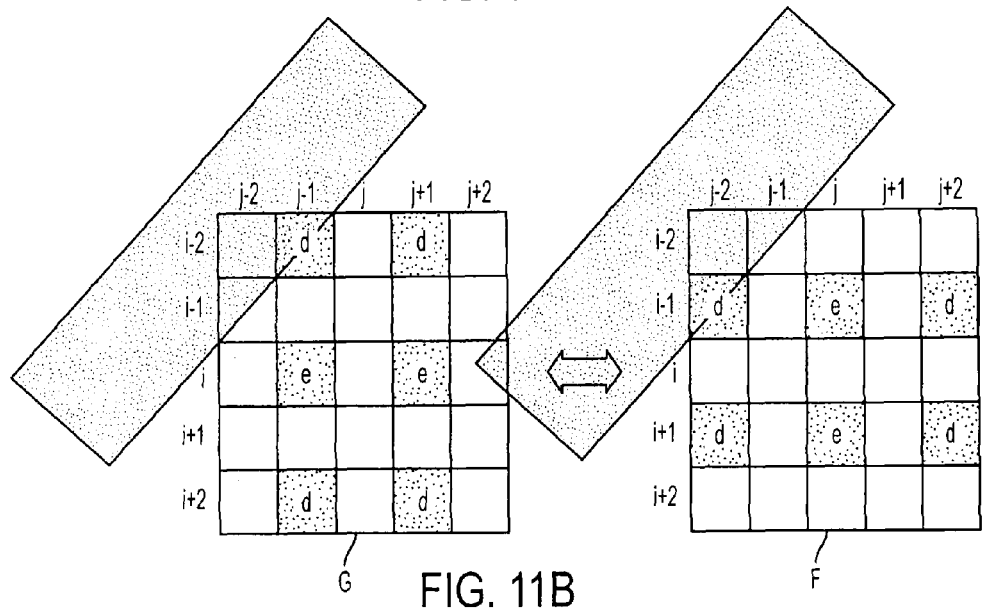
FIG. 11B illustrates a diagonal edge passing through pixel i−1, j−2 to pixel i−2, j−1 of red and blue kernel types G and F.

Kernel types F and G alternate along a diagonal edge, as shown in FIGS. 11A-11B, but the contribution of pixels on either side of the edge remains identical regardless of kernel type so no new constraints are imposed.

Figure 12A:
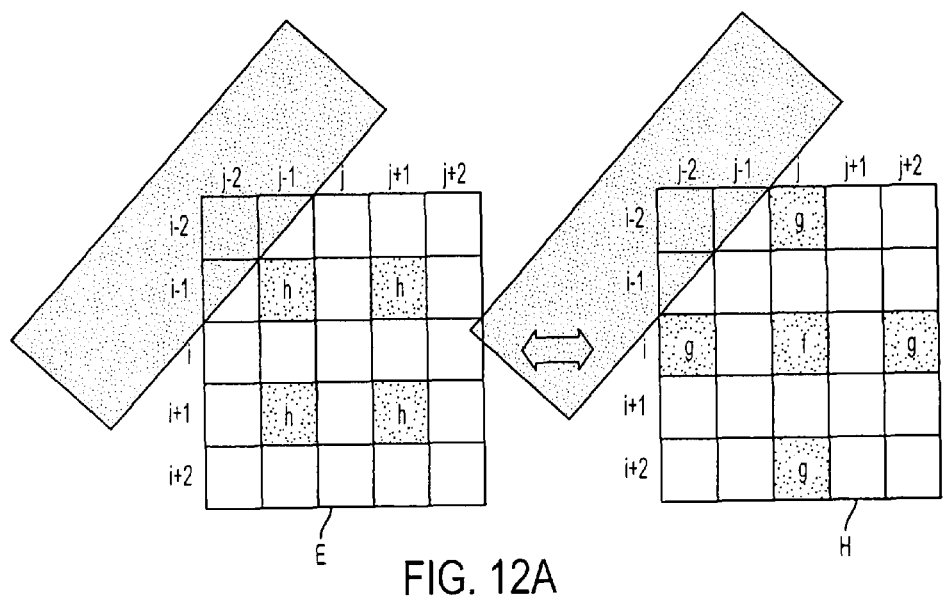
FIG. 12A illustrates a diagonal edge passing through pixel i−1, j−2 to pixel i−2, j−1 of red and blue kernel types E and H.
Figure 12B:
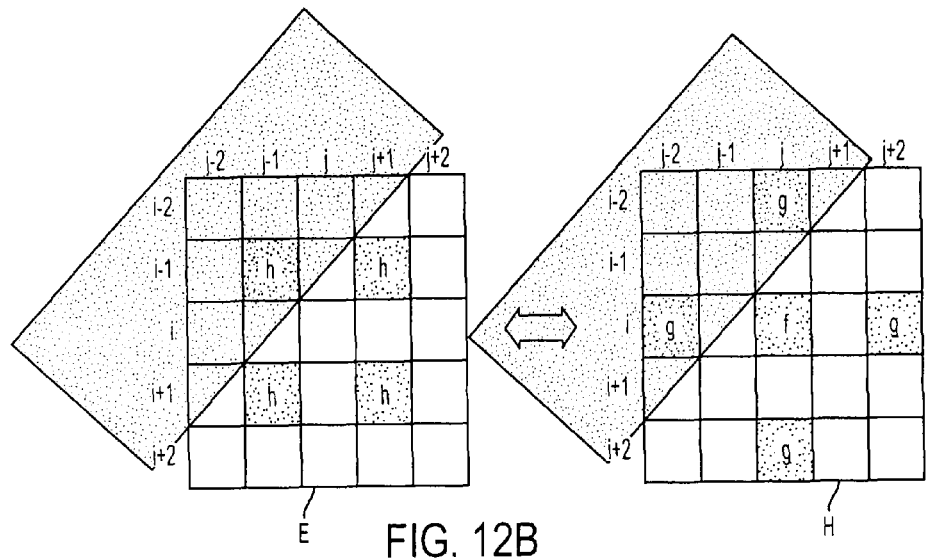
FIG. 12B illustrates a diagonal edge passing through pixel i+1, j−2 to pixel i−2, j+1 of red and blue kernel types E and H.

Kernel types E and H alternate along a diagonal edge as shown in FIGS. 12A-12B. Since none of the kernel pixels are covered by the non-flat field portion of the image in FIG. 12A, no new constraints are imposed. However, as shown in FIG. 12B, an edge passing closer to the center yields a new constraint:

$$h = 2g \Rightarrow 0.25 = 2g \text{ (substituting } h \text{ from Eqn. (49))} \Rightarrow g = 0.125. \quad (55)$$

Solving Eqn. (51) for $f \Rightarrow f = 1 - 4g$; $f = 1 - 4(0.125) \Rightarrow f = 0.5$.

Solving Eqn. (54) for $e \Rightarrow f = 4e - 1 \Rightarrow e = (f+1)/4 \Rightarrow e = (0.5+1)/4 \Rightarrow e = 0.375$.

Solving Eqn. (53) for $d \Rightarrow 2d = g \Rightarrow d = g/2 \Rightarrow d = 0.125/2 \Rightarrow d = 0.0625$.

Therefore, d=0.0625, e=0.375, f=0.5, g=0.125, and h=0.25. Equations (41)-(48) can be rewritten in terms of the calculated values for pixel weights d-h. For kernel type E, the output of the flat-field noise reduction module 30 (FIG. 2) can be expressed as:

$$R_{FFNR[i,j]} = 0.25 \cdot (p_{i-1,j-1} + p_{i-1,j+1} + p_{i+1,j-1} + p_{i+1,j+1}) \quad (56)$$

$$B_{FFNR[i,j]} = 0.25 \cdot (p_{i-1,j-1} + p_{i-1,j+1} + p_{i+1,j-1} + p_{i+1,j+1}) \quad (57)$$

The output of kernel type F can be expressed as:

$$R_{FFNR[i,j]} = 0.0625 \cdot (p_{i-1,j-2} + p_{i-1,j+2} + p_{i+1,j-2} + p_{i+1,j+2}) + 0.375 \cdot (p_{i-1,j} + p_{i+1,j}) \quad (58)$$

$$B_{FFNR[i,j]} = 0.0625 \cdot (p_{i-1,j-2} + p_{i-1,j+2} + p_{i+1,j-2} + p_{i+1,j+2}) + 0.375 \cdot (p_{i-1,j} + p_{i+1,j}) \quad (59)$$

The output of kernel type G can be expressed as:

$$R_{FFNR[i,j]} = 0.0625 \cdot (p_{i-2,j-1} + p_{i-2,j+1} + p_{i+2,j-1} + p_{i+2,j+1}) + 0.375 \cdot (p_{i,j-1} + p_{i,j+1}) \quad (60)$$

$$B_{FFNR[i,j]} = 0.0625 \cdot (p_{i-2,j-1} + p_{i-2,j+1} + p_{i+2,j-1} + p_{i+2,j+1}) + 0.375 \cdot (p_{i,j-1} + p_{i,j+1}) \quad (61)$$

The output of kernel type H can be expressed as:

$$R_{FFVR[i,j]} = 0.125 \cdot (p_{i,j-2} + p_{i,j+2} + p_{i-2,j} + p_{i+2,j}) + 0.5 \cdot p_{i,j} \quad (62)$$

$$B_{FFNR[i,j]} = 0.125 \cdot (p_{i,j-2} + p_{i,j+2} + p_{i-2,j} + p_{i+2,j}) + 0.5 \cdot p_{i,j} \quad (63)$$

Figure 13:
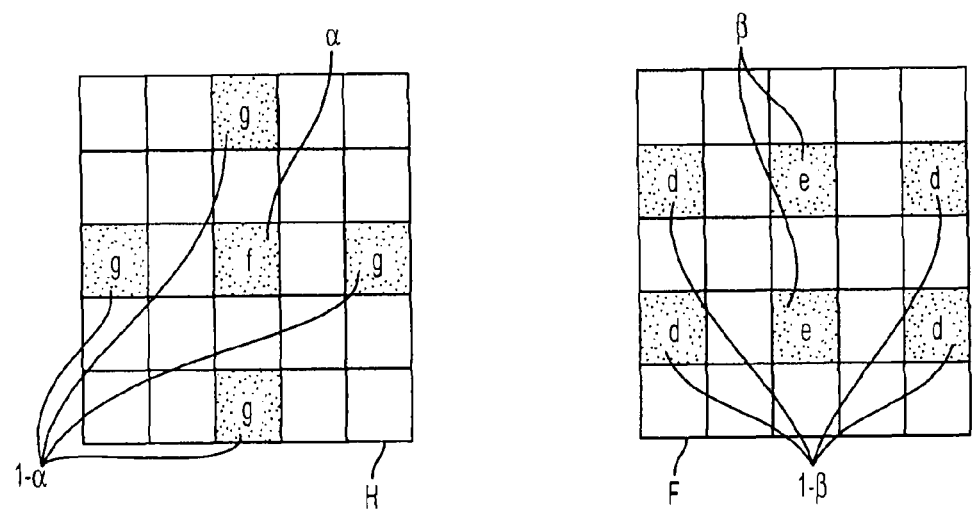
FIG. 13 illustrates red and blue kernel types F and H with pixel weights d, e, f, and g expressed in terms of alpha and beta.

It should be appreciated that while the above pixel weights (pixel weights a-c for green kernels and pixel weights d-h for red and blue kernels) have been selected to reduce zipper effect, pixel weights can also be selected for noise reduction or for a combination of reduced zipper effect and improved noise reduction. In a desired embodiment, the output of kernel types F, G, and H (FIG. 7) are represented in terms of pixel weights alpha ($\alpha$) and beta ($\beta$) rather than in terms of pixel weights d, e, f, and g, reducing the number of variables from four to two for ease of implementation. As shown in FIG. 13, alpha is defined to equal pixel weight f to specify how much pixel weight is placed on the kernel center in kernel type H as compared to the pixel weight g of the pixels further from the kernel center. Similarly, beta specifies how much pixel weight is placed on pixels near the kernel center in kernel types F and G compared to the pixel weight d of the pixels further away.

$$\alpha = f \quad (64)$$

$$1-\alpha = 4g \quad (65)$$

$$\beta = 2e \quad (66)$$

$$1-\beta = 4d \quad (67)$$

$$\alpha = 2\beta - 1 \text{ (because } f = 4e-1) \quad (68)$$

$$\beta = (\alpha+1)/2 \quad (69)$$

The output of kernel type F can be expressed in terms of alpha and beta as:

$$R_{FFNR[i,j]} = \frac{(1-\beta)}{4} \cdot (p_{i-1,j-2} + p_{i-1,j+2} + p_{i+1,j-2} + p_{i+1,j+2}) + \frac{\beta}{2} \cdot (p_{i-1,j} + p_{i+1,j}) \quad (70)$$

$$B_{FFNR[i,j]} = \frac{(1-\beta)}{4} \cdot (p_{i-1,j-2} + p_{i-1,j+2} + p_{i+1,j-2} + p_{i+1,j+2}) + \frac{\beta}{2} \cdot (p_{i-1,j} + p_{i+1,j}) \quad (71)$$

The output of kernel type G can be expressed in terms of alpha and beta as:

$$R_{FFNR[i,j]} = \frac{(1-\beta)}{4} \cdot (p_{i-2,j-1} + p_{i-2,j+1} + p_{i+2,j-1} + p_{i+2,j+1}) + \frac{\beta}{2} \cdot (p_{i,j-1} + p_{i,j+1}) \quad (72)$$

$$B_{FFNR[i,j]} = \frac{(1-\beta)}{4} \cdot (p_{i-2,j-1} + p_{i-2,j+1} + p_{i+2,j-1} + p_{i+2,j+1}) + \frac{\beta}{2} \cdot (p_{i,j-1} + p_{i,j+1}) \quad (73)$$

The output of kernel type H can be expressed in terms of alpha and beta as:

$$R_{FFNR[i,j]} = \frac{(1-\alpha)}{4} \cdot (p_{i,j-2} + p_{i,j+2} + p_{i-2,j} + p_{i+2,j}) + \alpha \cdot p_{i,j} \quad (74)$$

$$B_{FFNR[i,j]} = \frac{(1-\alpha)}{4} \cdot (p_{i,j-2} + p_{i,j+2} + p_{i-2,j} + p_{i+2,j}) + \alpha \cdot p_{i,j} \quad (75)$$

Alpha and beta have been defined in terms of pixel weights f and e which were derived to reduce the zipper effect in images. Accordingly, to maximize zipper effect reduction:

$$\alpha = 0.5 \quad (76)$$

$$\beta = 0.75 \quad (77)$$

However, it may be desirable to calculate alpha and beta for noise optimization. For example, assuming for a flat-field gray (i.e., red equals green equals blue) area all pixel responses have a standard deviation of one. Noise values for kernel type H and kernel types F and G can be derived as a function of their pixel weight mixing assignments:

$$\sigma_\alpha = \sqrt{(\alpha \cdot 1)^2 + 4 \cdot ((1-\alpha)/4 \cdot 1)^2} \quad (78)$$

$$\sigma_\beta = \sqrt{4 \cdot ((1-\beta)/4 \cdot 1)^2 + 2 \cdot (\beta/2 \cdot 1)^2} \quad (79)$$

$$\sigma = \sqrt{\sigma_\alpha^2 + \sigma_\beta^2} \quad (80)$$

Noise reduction is optimized at approximately:

$$\alpha = 0.15 \quad (81)$$

$$\beta = 0.575 \quad (82)$$

Alpha and beta may then be selected to maximize noise reduction and zipper effect ($0.15 \leq \alpha \leq 0.5$ and $0.575 \leq \beta \leq 0.75$), with ideal optimization selection in a preferred embodiment occurring at:

$$\alpha = 84/256 = 0.328125 \quad (83)$$

$$\beta = 172/256 = 0.671875 \quad (84)$$

A pixel signal p for a pixel at location i,j can be demosaiced in the flat-field noise reduction module 30 (FIG. 2) as a function of the weighted sums of the values of the red, green, and blue pixels in the kernel containing the pixel at location i,j. A weighted select based on the presence of edges (as detected by the edge detect module 20 (FIG. 2)) can then be performed in the noise reduction module 40 (FIG. 2), selectively combining the outputs of the two demosaiced signals (i.e., the demosaic module 10 (FIG. 2) and the flat-field noise reduction module 30 (FIG. 2)) producing a noise reduced signal. The noise reduced signal is then sharpened in the sharpening module 80 (FIG. 2) based on a calculated luminance of the two demosaiced signals.

Figure 14A:
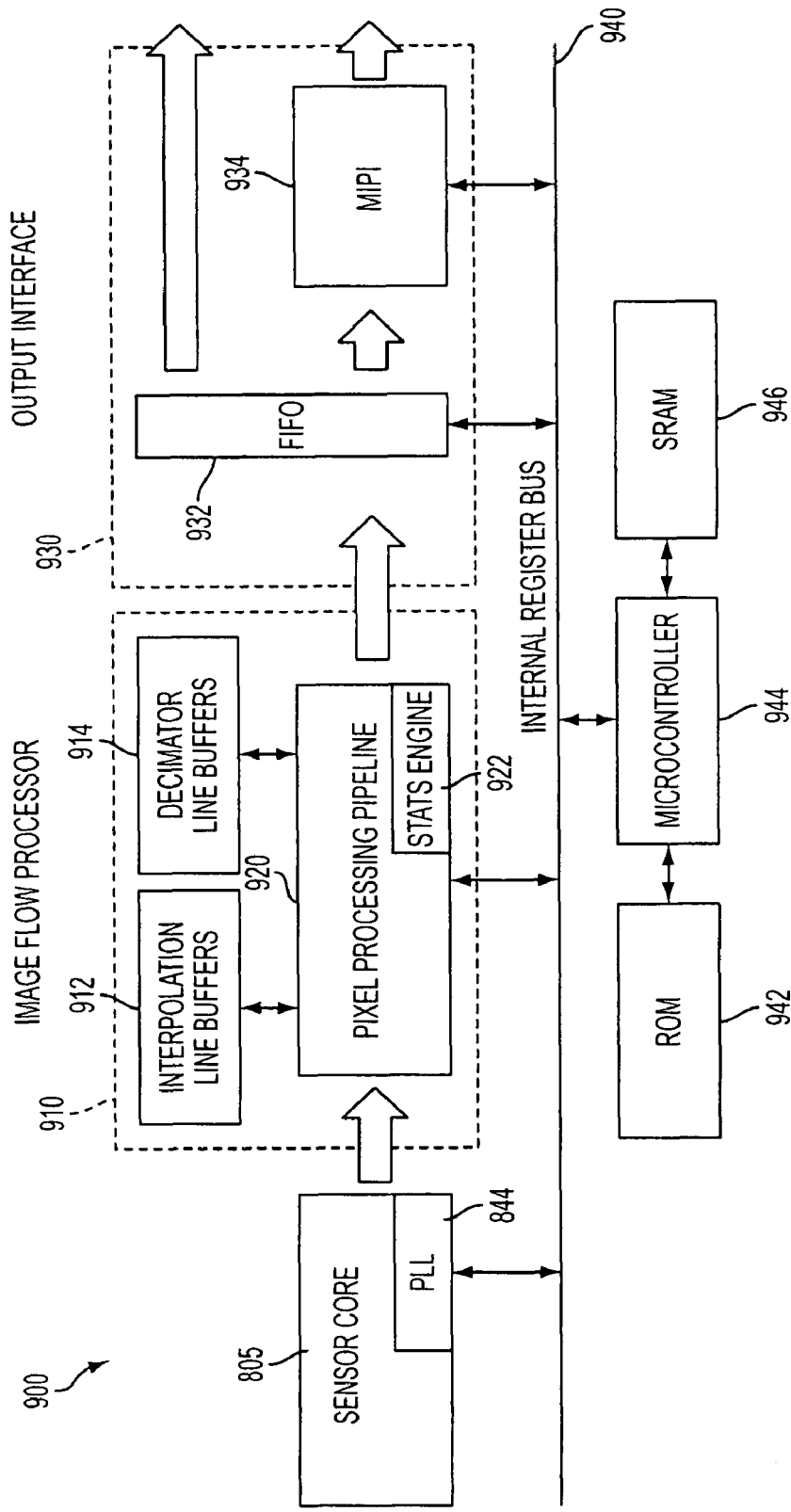
FIG. 14A illustrates a block diagram of system-on-a-chip imaging device constructed in accordance with an embodiment.

FIG. 14A illustrates a block diagram of an exemplary system-on-a-chip (SOC) imaging device 900 constructed in accordance with an embodiment. The imaging device 900 comprises a sensor core 805 that communicates with an image flow processor 910 that is also connected to an output interface 930. A phase locked loop (PLL) 844 is used as a clock for the sensor core 805. The image flow processor 910, which is responsible for image and color processing, includes interpolation line buffers 912, decimator line buffers 914, and a pixel processing pipeline 920. One of the functions of the color processor pipeline 920 is to perform pixel processing operations, such as, for example, demosaicing in accordance with the disclosed embodiments. The pixel processing pipeline 920 includes, among other things, a statistics engine 922. The output interface 930 includes an output first-in-first-out (FIFO) parallel output 932 and a serial Mobile Industry Processing Interface (MIPI) output 934. The user can select either a serial output or a parallel output by setting registers within the chip. An internal register bus 940 connects read only memory (ROM) 942, a microcontroller 944 and a static random access memory (SRAM) 946 to the sensor core 805, image flow processor 910 and the output interface 930.

Figure 14B:
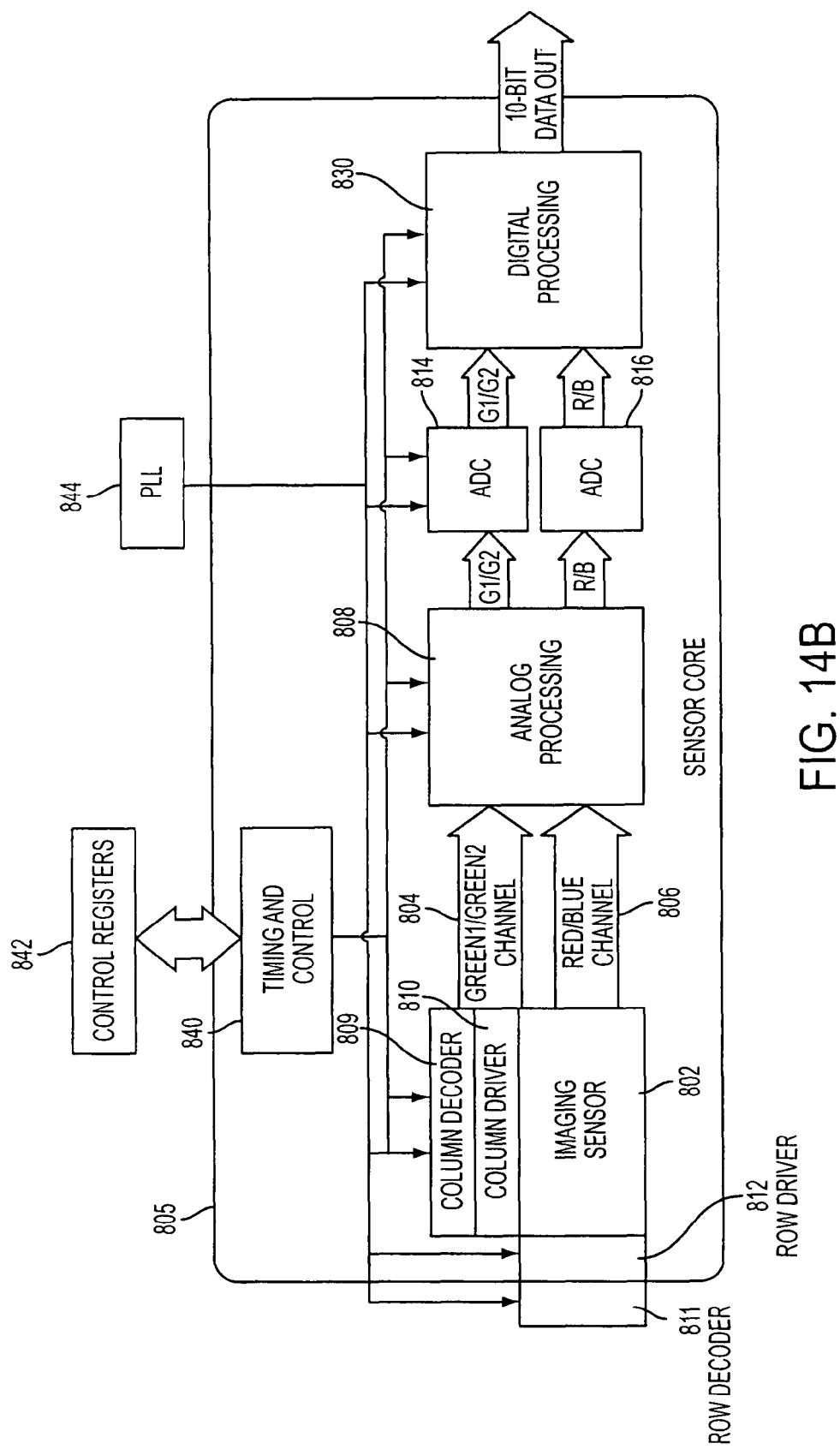
FIG. 14B illustrates an example of a sensor core used in the FIG. 9A device.

FIG. 14B illustrates a sensor core 805 used in the FIG. 14A imaging device 900. The sensor core 805 includes an imaging sensor 802, which is connected to analog processing circuitry 808 by a greenred/greenblue channel 804 and a red/blue channel 806. Although only two channels 804, 806 are illustrated, there are effectively two green channels, one red channel, and one blue channel, for a total of four channels. The greenred (i.e., Green1) and greenblue (i.e., Green2) signals are readout at different times (using channel 804) and the red and blue signals are readout at different times (using channel 806). The analog processing circuitry 808 outputs processed greenred/greenblue signals G1/G2 to a first analog-to-digital converter (ADC) 814 and processed red/blue signals R/B to a second analog-to-digital converter 816. The outputs of the two analog-to-digital converters 814, 816 are sent to a digital processor 830.

Connected to, or as part of, the imaging sensor 802 are row and column decoders 811, 809 and row and column driver circuitry 812, 810 that are controlled by a timing and control circuit 840. The timing and control circuit 840 uses control registers 842 to determine how the imaging sensor 802 and other components are controlled, for example, controlling the mode of operation of the imaging sensor 802. As set forth above, the PLL 844 serves as a clock for the components in the core 805.

The imaging sensor 802 comprises a plurality of pixel circuits arranged in a predetermined number of columns and rows. In operation, the pixel circuits of each row in imaging sensor 802 are all turned on at the same time by a row select line and the pixel circuits of each column are selectively output onto column output lines by a column select line. A plurality of row and column lines are provided for the entire imaging sensor 802. The row lines are selectively activated by row driver circuitry 812 in response to the row address decoder 811 and the column select lines are selectively activated by a column driver 810 in response to the column address decoder 809. Thus, a row and column address is provided for each pixel circuit. The timing and control circuit 840 controls the address decoders 811, 809 for selecting the appropriate row and column lines for pixel readout, and the row and column driver circuitry 812, 810, which apply driving voltage to the drive transistors of the selected row and column lines.

Each column contains sampling capacitors and switches in the analog processing circuit 808 that read a pixel reset signal Vrst and a pixel image signal Vsig for selected pixel circuits. Because the core 805 uses greenred/greenblue channel 804 and a separate red/blue channel 806, circuitry 808 will have the capacity to store Vrst and Vsig signals for greenred, greenblue, red, and blue pixel signals. A differential signal (Vrst-Vsig) is produced by differential amplifiers contained in the circuitry 808 for each pixel. Thus, the signals G1/G2 and R/B are differential signals that are then digitized by a respective analog-to-digital converter 814, 816. The analog-to-digital converters 814, 816 supply digitized G1/G2, R/B pixel signals to the digital processor 830, which forms a digital image output (e.g., a 10-bit digital output). The digital processor 830 performs pixel processing operations. The output is sent to the image flow processor 910 (FIG. 14A).

Although the sensor core 805 has been described with reference to use with a CMOS imaging sensor, this is merely one example sensor core that may be used. Embodiments of the invention may also be used with other sensor cores having a different readout architecture. While the imaging device 900 (FIG. 14A) has been shown as a system-on-a-chip, it should be appreciated that the embodiments are not so limited. Other imaging devices, such as, for example, a stand-alone sensor core 805 coupled to a separate signal processing chip could be used in accordance with the embodiments. While the demosaicing has been described as occurring in the color processor pipeline 920 (FIG. 14A), it should be appreciated that demosaicing can be performed in the digital processing 830 (FIG. 14B). Additionally, raw RGB imaging data can be output from the 10-bit data output (FIG. 14B) and stored and demosaiced elsewhere, for example, in a system as described in relation to FIG. 15 or in a stand-alone image processing system.

Figure 15:
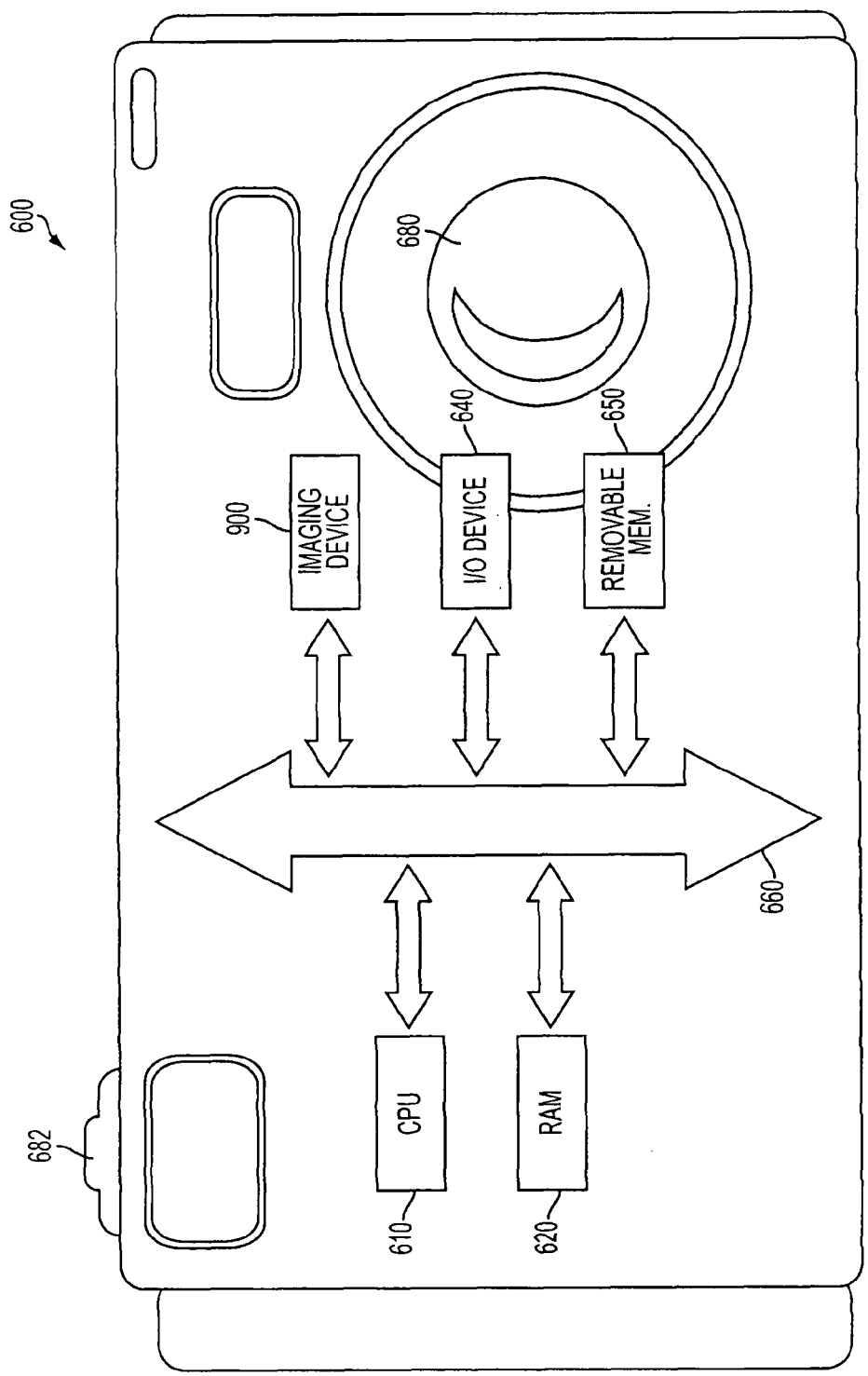
FIG. 15 shows a system embodiment incorporating at least one imaging device.

FIG. 15 shows a typical system 600, such as, for example, a camera. The system 600 is an example of a system having digital circuits that could include an imaging device 900. Without being limiting, such a system could include a computer system, camera system, scanner, machine vision, vehicle navigation system, video phone, surveillance system, auto focus system, star tracker system, motion detection system, image stabilization system, and other systems employing an imaging device 900.

System 600, for example, a camera system, includes a lens 680 for focusing an image on the imaging device 900 when a shutter release button 682 is pressed. System 600 generally comprises a central processing unit (CPU) 610, such as a microprocessor that controls camera functions and image flow, and communicates with an input/output (I/O) device 640 over a bus 660. The imaging device 900 also communicates with the CPU 610 over the bus 660. The system 600 also includes random access memory (RAM) 620, and can include removable memory 650, such as flash memory, which also communicates with the CPU 610 over the bus 660. The imaging device 900 may be combined with the CPU 610, with or without memory storage on a single integrated circuit, such as, for example, a system-on-a-chip, or on a different chip than the CPU 610. As described above, raw RGB image data from the imaging sensor 802 (FIG. 14B) can be output from the imaging device 900 and stored, for example in the random access memory 620 or the CPU 610. Demosaicing can then be performed on the stored data by the CPU 610, or can be sent outside the camera and stored and operated on by a stand-alone processor, e.g., a computer, external to system 600 in accordance with the embodiments described herein.

Some of the advantages of the demosaicing and noise reduction methods disclosed herein include minimizing undesirable artifacts while maximizing noise suppression. Additionally, the disclosed demosaicing and noise reduction methods are simple to implement in hardware or software at a low cost. That is, the methods described above can be implemented in a pixel processing circuit, which can be part of the pixel processing pipeline 920 (FIG. 14A). The pixel processing circuit can be implemented as, for example, hardware logic, a programmed processor, a combination of the two, or with other signal processing circuits. For example, the methods described above can be implemented in computer instructions and stored in a computer readable medium to perform a method of adjusting a color imaging pixel signal from raw imaging data as a function of the weighted sums of a first and second calculated demosaic value of the pixel signal being adjusted, and a calculated edge value to produce a noise reduced value. Additionally, the computer instructions may be configured to calculate a sharpening value to be applied to the noise reduced value.

While the embodiments have been described in detail in connection with desired embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, while the embodiments are described in connection with a CMOS imaging sensor, they can be practiced with image data from other types of imaging sensors, for example, CCD imagers and others. Additionally, three or five channels, or any number of color channels may be used, rather than four, for example, and they may comprise additional or different colors/channels than greenred, red, blue, and greenblue, such as e.g., cyan, magenta, yellow (CMY); cyan, magenta, yellow, black (CMYK); or red, green, blue, indigo (RGBI).

What is claimed as new and desired to be protected by Letters Patent of the United States is:

1. A method of adjusting a color imaging pixel signal of an imaging pixel from a pixel array, the method comprising:

using at least one processor to perform the steps of:

determining a first demosaiced value of the imaging pixel signal using a first demosaicing method; and
determining a second demosaiced value of the imaging pixel signal using a second demosaicing method employing noise reduction;
determining an edge value; and
determining a noise reduced value of the imaging pixel signal as a function of the first demosaiced value, the second demosaiced value, and the edge value.

2. The method of claim 1, wherein the step of determining the edge value comprises detecting the presence of an edge in at least a portion of the pixel array at an area containing an imaging pixel associated with the signal being adjusted.

3. The method of claim 1, wherein the step of determining the edge value comprises comparing signals of pairs of pixels neighboring the imaging pixel and selecting the maximum difference between pixel signals for one of the pairs.

4. The method of claim 1 wherein the noise reduced value is determined as a weighted combination of the first demosaiced value and the second demosaiced value, wherein the weight is determined as a function of the edge value and at least one of the first demosaiced value and the second demosaiced value.

5. The method of claim 4, wherein the weight is further determined as a function of at least one of a luminance of the first demosaiced value and a luminance of the second demosaiced value.

6. The method of claim 4, wherein:
the second demosaicing method is based on a pixel averaging;
the first demosaiced value has a first associated weight;
the second demosaiced value has a second associated weight; and
the noise reduced value is determined as a weighted sum of the first demosaiced value and the second demosaiced value, the first and second weights being determined such that more or less pixel averaging results.

7. The method of claim 4, wherein the noise reduced value is determined according to:

$$R_{NR[i,j]} = w_{FFNR[i,j]} \cdot R_{D[i,j]} + (1 - w_{FFNR[i,j]}) \cdot R_{FFNR[i,j]},$$

$$G_{NR[i,j]} = w_{FFNR[i,j]} \cdot G_{D[i,j]} + (1 - w_{FFNR[i,j]}) \cdot G_{FFNR[i,j]}, \text{ and}$$

$$B_{NR[i,j]} = w_{FFNR[i,j]} \cdot B_{D[i,j]} + (1 - w_{FFNR[i,j]}) \cdot B_{FFNR[i,j]}$$

where i,j denotes a pixel position; $R_{NR[i,j]}$, $G_{NR[i,j]}$, and $B_{NR[i,j]}$ are components of the noise reduced value; $w_{FFNR[i,j]}$ is the weight; $R_{D[i,j]}, G_{D[i,j]}$, and $B_{D[i,j]}$ are components of the first demosaiced value; and where $R_{FFNR[i,j]}$, $G_{FFNR[i,j]}$, and $B_{FFNR[i,j]}$ are components of the second demosaiced value.

8. The method of claim 4, wherein the weight is determined according to:

$$w_{FFNR[i,j]} = \begin{cases} 0, & v_{FFNR[i,j]} \leq 0 \\ 1, & v_{FFNR[i,j]} \geq 1 \\ v_{FFNR[i,j]}, & 0 < v_{FFNR[i,j]} < 1 \end{cases}$$

where i,j denotes a pixel position and $v_{FFNR[i,j]}$ is a weight determined according to:

$$v_{FFNR[i,j]} = (E_{i,j} - T_{FFNR[i,j]}) \cdot G_{FFNR,r[i,j]}$$

where $E_{i,j}$ is the determined edge value, $G_{FFNR,r[i,j]}$ is a predetermined rate of transition from flat-field noise reduction averaging to no averaging as a function of pixel brightness, and $T_{FFNR[i,j]}$ is a threshold value based on an offset $T_{FFNR,min[i,j]}$, a constant specifying a pixel signal value such that any lesser value will always result in full-strength flat-field noise reduction averaging and where $T_{FFNR[i,j]}$ is determined according to:

$$T_{FFNR[i,j]} = T_{FFNR,min[i,j]} + Y_{FFNR[i,j]} \cdot G_{FFNR,p[i,j]}$$

where $G_{FFNR,p[i,j]}$ is a pixel noise model coefficient subjecting brighter pixels to more or less averaging than darker ones and $Y_{FFNR[i,j]}$ is a pixel luminance of the second demosaiced value.

9. The method of claim 1, further comprising determining a sharpened value of the imaging pixel signal as a function of the noise reduced value and at least one of a luminance of the first demosaiced value and a luminance of the second demosaiced value.

10. The method of claim 9, wherein the sharpened value is determined according to:

$$R_{i,j} = R_{NR[i,j]} + G_{A[i,j]} \cdot \Delta Y_{i,j},$$

$$G_{i,j} = G_{NR[i,j]} + G_{A[i,j]} \cdot \Delta Y_{i,j}, \text{ and}$$

$$B_{i,j} = B_{NR[i,j]} + G_{A[i,j]} \cdot \Delta Y_{i,j}$$

where i,j denotes a pixel position; $R_{i,j}$, $G_{i,j}$, and $B_{i,j}$ are components of the sharpened value; $R_{NR[i,j]}$, $G_{NR[i,j]}$, and $B_{NR[i,j]}$ are components of the noise reduced value; $G_{A[i,j]}$ is a sharpening gain which controls the amount of sharpening applied to the signal of the imaging pixel; and $\Delta Y_{i,j}$ is a luminance based aperture correction value.

11. The method of claim 10, wherein the luminance based aperture correction value is determined according to:

$$\Delta Y_{i,j} = \max(|Y_{D[i,j]} - Y_{FFNR[i,j]}| - T_{A[i,j]}, 0) \cdot \text{sgn}(Y_{D[i,j]} - Y_{FFNR[i,j]})$$

where $Y_{D[i,j]}$ is a pixel luminance of the first demosaiced value; $Y_{FFNR[i,j]}$ is a pixel luminance of the second demosaiced value; $\text{sgn}(Y_{D[i,j]} - Y_{FFNR[i,j]})$ is the sign of $Y_{D[i,j]} - Y_{FFNR[i,j]}$; $T_{A[i,j]}$ is a minimum luminance difference value necessary to produce a sharpening effect as determined by:

$$T_{A[i,j]} = T_{A,min[i,j]} + G_{A,T[i,j]} \cdot Y_{D[i,j]}$$

where $T_{A,min[i,j]}$ is the minimum value for $T_{A[i,j]}$ and $G_{A,T[i,j]}$ is a pixel noise model coefficient allowing for sharpening of brighter pixels.

12. The method of claim 1, wherein the second demosaic method is configured to:
select a kernel having a kernel size and a center pixel location for each viable color pattern for a kernel of the kernel size such that each selected kernel has a unique color pattern;
determine the color pixel configurations of the selected kernels for each color;
select a subset of pixels from the color pixel configurations for each selected kernel for each color; and
assign a pixel weight to each pixel within the subsets, the pixel weight being derived as a function of at least one of: the color the pixels, an edge crossing the kernels, a shape of the subset of pixels, a location of the pixel within the kernel, a zipper effect, and pixel noise.

13. The method of claim 12, wherein the step of determining the second demosaiced value further comprises:
selecting a kernel wherein the imaging pixel is located at the center pixel location; and determining the demosaiced signal of the imaging pixel signal as a function of at least a subset of the signals of the kernel and their respective pixel weights.

14. A method of adjusting a color imaging pixel signal of an imaging pixel from a pixel array, the method comprising:
determining a first demosaiced value of the imaging pixel signal using a first demosaicing method;
determining a second demosaiced value of the imaging pixel signal using a second demosaicing method employing noise reduction and using pixel signal averaging;
determining an edge value by detecting the presence of an edge in at least a portion of the array at an area containing an imaging pixel associated with the signal being adjusted;
determining a weight as a function of the edge value, a luminance of the second demosaiced value, and at least a constant;
using at least one pixel processing circuit to determine a noise reduced value of the imaging pixel signal as a weighted combination of the first demosaiced value and the second demosaiced value, wherein the weight determines the amount of pixel averaging by weighting the demosaiced values;
determining a minimum luminance value necessary to produce a sharpening effect on the noise reduced value as a function of the luminance of the first demosaiced value;
determining a high-frequency sharpening signal value as a function of the luminance of the first demosaiced value, the second demosaiced value, and the minimum luminance value; and
determining a sharpened value as a function of the noise reduced value and the sharpening signal value.

15. An imaging device comprising:
an imaging sensor comprising an array of imaging pixels;
a signal processing circuit for adjusting signals from the array, the signal processing circuit comprising:
a first demosaicing module configured to determine a first demosaiced value of an imaging pixel signal using a first demosaicing method;
a second demosaicing module configured to determine a second demosaiced value of the imaging pixel signal using a second demosaicing method employing noise reduction;
an edge detection module configured to determine an edge value by detecting the presence of an edge in at least a portion of the array at an area containing an imaging pixel associated with the signal being adjusted; and
a noise reduction module configured to determine a noise reduced value of the imaging pixel signal as a function of the first demosaiced value, the second demosaiced value, and the edge value.

16. The imaging device of claim 15, wherein the edge detection module is configured to compare signals of pairs of pixels neighboring the imaging pixel and select the maximum difference between pixel signals for one of the pairs.

17. The imaging device of claim 15, wherein the noise reduction module is further configured to determine the noise reduced value as a weighted combination of the first demosaiced value and the second demosaiced value, wherein the weight is determined as a function of the edge value and at least one of the first demosaiced value and the second demosaiced value.

18. The imaging device of claim 17, wherein the weight is further determined as a function of at least one of a luminance of the first demosaiced value and a luminance of the second demosaiced value.

19. The imaging device of claim 17, wherein:
the second demosaicing method is based on a pixel averaging;
the first demosaiced value has a first associated weight;
the second demosaiced value has a second associated weight; and
the noise reduced value module is configured to determine the noise reduced value as a weighted sum of the first demosaiced value and the second demosaiced value, the first and second weights being determined such that more or less pixel averaging results.

20. The imaging device of claim 15, further comprising a sharpening module configured to determine a sharpened value of the imaging pixel signal as a function of the noise reduced value and at least one of a luminance of the first demosaiced value and a luminance of the second demosaiced value.

21. The imaging device of claim 15, wherein the imaging device is provided in a camera system.

22. A method of demosaicing a color image signal of an imaging pixel, the method comprising:
selecting a kernel having a kernel size and a center pixel location for each viable color pattern for a kernel of the kernel size such that each selected kernel has a unique color pattern;
determining the color pixel configurations of the selected kernels for each color;
selecting a subset of pixels from the color pixel configurations for each selected kernel for each color; and
assigning a pixel weight to each pixel within the subsets using at least one processor, the pixel weight being derived as a function of at least one of: the color the pixels, an edge crossing the kernels, a shape of the subset of pixels, a location of the pixel within the kernel, a zipper effect, and pixel noise.

23. The method of claim 22, wherein the step of determining the second demosaiced value further comprises:
selecting a kernel wherein the imaging pixel is located at the center pixel location: and
determining the demosaiced signal of the imaging pixel signal as a function of at least a subset of the signals of the kernel and their respective pixel weights.

24. The method of claim 23, wherein the second demosaiced value has a green component, a red component, and a blue component.

25. The method of claim 24, wherein the green component of the second demosaiced value is determined according to:

$$G_{FFNR[i,j]} = a \cdot (p_{i-1,j-1} + p_{i+1,j+1} + p_{i+1,j-1} + p_{i-1,j+1}) + b \cdot p_{i,j}$$

where $G_{FFNR[i,j]}$ is the green component for the imaging pixel signal $p_{i,j}$; I is a pixel row; j is a pixel column; an i,j notation denotes a pixel position within the selected kernel; a and b are pixel weights; p is a pixel signal value for a pixel located at a pixel position; and all of the p values are green pixel signals for one of the selected subset of pixels.

26. The method of claim 24, wherein the green component of the second demosaiced value is determined according to:

$$G_{FFNR[i,j]} = c \cdot (p_{i,j-1} + p_{i,j+1} + p_{i+1,j} + p_{i-,j})$$

where $G_{FFNR[i,j]}$ is the green component for the imaging pixel signal $p_{i,j}$; i a pixel row; j is a pixel column; an i,j notation denotes a pixel position within the selected kernel; c is a pixel weight; p is a pixel signal value for a pixel located at a pixel position; and all of the p values are green signals for one of the selected subset of pixels.

27. The method of claim 24, wherein the red component of the second demosaiced value is determined according to:

$$R_{FFNR[i,j]} = h \cdot (p_{i-1,j-1} + p_{i-1,j+1} + p_{i+1,j-1} + p_{i+1,j+1})$$

where $R_{FFNR[i,j]}$ is the red component for the imaging pixel signal $p_{i,j}$; i is a pixel row; j is a pixel column; an i,j notation denotes a pixel position within the selected kernel; h is a pixel weight; p is a pixel signal value for a pixel located at a pixel position; and all of the p values are red signals for one of the selected subset of pixels.

28. The method of claim 24, wherein the red component of the second demosaiced value is determined according to:

$$R_{FFNR[i,j]} = d \cdot (p_{i-1,j-2} + p_{i-1,j+2} + p_{i+1,j-2} + p_{i+1,j+2}) + e \cdot (p_{i-1,j} + p_{i+1,j})$$

where $R_{FFNR[i,j]}$ is the red component for the imaging pixel signal $p_{i,j}$; i is a pixel row; j is a pixel column: an i,j notation denotes a pixel position within the selected kernel; d and e are pixel weights; p is a pixel signal value for a pixel located at a pixel position; and all of the p values are red signals for one of the selected subset of pixels.

29. The method of claim 24, wherein the red component of the second demosaiced value is determined according to:

$$R_{FFNR[i,j]} = d \cdot (p_{i-2,j-1} + p_{i-2,j+1} + p_{i+2,j-1} + p_{i+2,j+1}) + e \cdot (p_{i,j-1} + p_{i,j+1})$$

where $R_{FFNR[i,j]}$ is the red component for the imaging pixel signal $p_{i,j}$; i is a pixel row; j is a pixel column; an i,j notation denotes a pixel position within the selected kernel; d and e are pixel weights; p is a pixel signal value for a pixel located at a pixel position; and all of the p values are red signals for one of the selected subset of pixels.

30. The method of claim 24, wherein the red component of the second demosaiced value is determined according to:

$$R_{FFNR[i,j]} = g \cdot (p_{i,j-2} + p_{i,j+2} + p_{i-2,j} + p_{i+2,j}) + f \cdot p_{i,j}$$

where $R_{FFNR[i,j]}$ is the red component for the imaging pixel signal $p_{i,j}$; i is a pixel row; j is a pixel column; an i,j notation denotes a pixel position within the selected kernel; f and g are pixel weights; p is a pixel signal value for a pixel located at a pixel position; and all of the p values are red signals for one of the selected subset of pixels.

31. The method of claim 24, wherein the blue component of the second demosaiced value is determined according to:

$$B_{FFNR[i,j]} = h \cdot (p_{i-1,j-1} + p_{i-1,j+1} + p_{i+1,j-1} + p_{i+1,j+1})$$

where $B_{FFNR[i,j]}$ is the blue component for the imaging pixel signal $p_{i,j}$; i is a pixel row; j is a pixel column; an i,j notation denotes a pixel position within the selected kernel; h is a pixel weight; p is a pixel signal value for a pixel located at a pixel position; and all of the p values are blue signals for one of the selected subset of pixels.

32. The method of claim 24, wherein the blue component of the second demosaiced value is determined according to:

$$B_{FFNR[i,j]} = d \cdot (p_{i-1,j-2} + p_{i-1,j+2} + p_{i+1,j-2} + p_{i+1,j+2}) + e \cdot (p_{i-1,j} + p_{i+1,j})$$

where $B_{FFNR[i,j]}$ is the blue component for the imaging pixel signal $p_{i,j}$; i is a pixel row; j is a pixel column; an i,j notation denotes a pixel position within the selected kernel; d and e are pixel weights; p is a pixel signal value for a pixel located at a pixel position; and all of the p values are blue signals for one of the selected subset of pixels.

33. The method of claim 24, wherein the blue component of the second demosaiced value is determined according to:

$$B_{FFNR[i,j]} = d \cdot (p_{i-2,j-1} + p_{i-2,j+1} + p_{i+2,j-1} + p_{i+2,j+1}) + e \cdot (p_{i,j-1} + p_{i,j+1})$$

where $B_{FFNR[i,j]}$ is the blue component for the imaging pixel signal $p_{i,j}$; i is a pixel row; j is a pixel column; an i,j notation denotes a pixel position within the selected kernel; d and e are pixel weights; p is a pixel signal value for a pixel located at a pixel position; and all of the p values are blue signals for one of the selected subset of pixels.

34. The method of claim 24, wherein the blue component of the second demosaiced value is determined according to:

$$B_{FFNR[i,j]} = g \cdot (p_{i,j-2} + p_{i,j+2} + p_{i-2,j} + p_{i+2,j}) + f \cdot p_{i,j}$$

where $B_{FFNR[i,j]}$ is the blue component for the imaging pixel signal $p_{i,j}$; i is a pixel row; j is a pixel column; an i,j notation denotes a pixel position within the selected kernel; f and g are pixel weights; p is a pixel signal value for a pixel located at a pixel position; and all of the p values are blue signals for one of the selected subset of pixels.

35. The method of claim 22, wherein the pixel weight assigned to each pixel is selected to reduce at least one of a zipper effect and pixel noise.

* * * * *